US012804140B2

(12) United States Patent
Xie

(10) Patent No.: US 12,804,140 B2
(45) Date of Patent: Nov. 17, 2026

(54) FILTERING METHOD, ENCODER, DECODER AND STORAGE MEDIUM

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1 day.

(21) Appl. No.: 18/914,875

(22) Filed: Oct. 14, 2024

(65) Prior Publication Data

US 2025/0039369 A1 Jan. 30, 2025

Related U.S. Application Data

(63) Continuation of application No. PCT/CN2022/086726, filed on Apr. 13, 2022.

(51) Int. Cl.

*H04N 19/117* (2014.01)
*H04N 19/176* (2014.01)
(Continued)

(52) U.S. Cl.

CPC ......... *H04N 19/117* (2014.11); *H04N 19/176* (2014.11); *H04N 19/46* (2014.11); *H04N 19/80* (2014.11)

(58) Field of Classification Search

CPC .... H04N 19/117; H04N 19/124; H04N 19/13; H04N 19/176; H04N 19/46; H04N 19/70; H04N 19/80; H04N 19/82; H04N 19/86
(Continued)

(56) References Cited

U.S. PATENT DOCUMENTS

2014/0321534 A1 10/2014 Su et al.
2022/0394308 A1* 12/2022 Li .......................... H04N 19/82
(Continued)

FOREIGN PATENT DOCUMENTS

CN 108184129 A 6/2018
CN 111586411 A 8/2020
(Continued)

OTHER PUBLICATIONS

Office Action issued by China Patent Office for Application No. 202411882782.6 mailed on Sep. 5, 2025.
(Continued)

*Primary Examiner* — Behrooz M Senfi
(74) *Attorney, Agent, or Firm* — BAYES PLLC

(57) ABSTRACT

A filtering method includes: obtaining a frame-level usage flag by parsing a bitstream; in response to that the frame-level usage flag indicates that the neural network filtering is enabled for the current frame, obtaining a frame-level control flag and a frame-level quantization parameter adjustment flag; in response to that the frame-level control flag indicates that the neural network filtering is applied to all blocks in the current frame, and that the frame-level quantization parameter adjustment flag indicates that the quantization parameter is adjusted for the current frame, obtaining an adjusted frame-level quantization parameter; and filtering a current block in the current frame based on the adjusted frame-level quantization parameter and a neural network filtering model to obtain first residual information of the current block.

19 Claims, 8 Drawing Sheets

(51) Int. Cl.

| | |
|---|---|
| ***H04N 19/46*** | (2014.01) |
| ***H04N 19/80*** | (2014.01) |

(58) Field of Classification Search

USPC ........................................................ 375/240.02

See application file for complete search history.

(56) References Cited

U.S. PATENT DOCUMENTS

| | | | | |
|---|---|---|---|---|
| 2024/0305829 | A1 * | 9/2024 | Deshpande | H04N 19/70 |
| 2025/0150584 | A1 * | 5/2025 | Xie | H04N 19/196 |
| 2025/0240415 | A1 * | 7/2025 | Xie | H04N 19/86 |
| 2025/0240417 | A1 * | 7/2025 | Dai | H04N 19/70 |

FOREIGN PATENT DOCUMENTS

| | | | | |
|---|---|---|---|---|
| CN | 111711824 A | | 9/2020 | |
| WO | WO-2022052533 A1 | * | 3/2022 | G06N 3/045 |
| WO | 2022072659 A1 | | 4/2022 | |

OTHER PUBLICATIONS

International Search Report and Written Opinion of the International Searching Authority regarding International Patent Application No. PCT/CN2022/086726, dated Dec. 16, 2022. Translation provided by WIPO Translate.

AHG11: neural network based in-loop filter with constrained storage and low complexity; Liqiang Wang et al.; Joint Video Experts Team (JVET) of ITU-T SG 16 WP 3 and ISO/IEC JTC 1/SC 29; 24th Meeting, by teleconference, Oct. 6-15, 2021; Document: JVET-X0055-r3.

EE1-1.1-related: alternative filter designs; Liqiang Wang; Joint Video Experts Team (JVET) of ITU-T SG 16 WP 3 and ISO/IEC JTC 1/SC 29; 25th Meeting, by teleconference, Jan. 12-21, 2022; Document: JVET-Y0080-v3.

EE1-1.1: neural network based in-loop filter with constrained storage and low complexity; Liqiang Wang; Joint Video Experts Team (JVET) of ITU-T SG 16 WP 3 and ISO/IEC JTC 1/SC 29; 25th Meeting, by teleconference, Jan. 12-21, 2022 Document: JVET-Y0078-v2.

* cited by examiner

The Resblock architecture

FILTERING METHOD, ENCODER, DECODER AND STORAGE MEDIUM

CROSS-REFERENCE TO RELATED APPLICATION

This application is a Continuation Application of International Application No. PCT/CN2022/086726 filed Apr. 13, 2022, which is incorporated herein by reference in its entirety.

TECHNICAL FIELD

Embodiments of the present application relate to the field of picture processing technology, and particularly to a filtering method, an encoder, a decoder, and a storage medium.

BACKGROUND

In a video coding and decoding system, a block-based hybrid coding architecture is used in most video coding processes. In the architecture, each frame of a video is partitioned into several coding tree units (CTUs), and a coding tree unit may be further partitioned into several rectangular coding units (CUs). These coding units may be rectangular blocks or square blocks. Since adjacent CUs use different coding parameters, such as different transform processes, different quantization parameters (QPs), different prediction modes, or different reference picture frames, and magnitudes of errors and distribution characteristics introduced in various CUs are independent of each other, the discontinuity of a boundary between adjacent CUs causes blocking effect, which affects the subjective quality and objective quality of a reconstructed picture and even affects the prediction accuracy of subsequent encoding and decoding.

Thus, during an encoding and decoding process, an in-loop filter is used to improve the subjective quality and objective quality of a reconstructed picture. An in-loop filtering method based on neural networks has the most outstanding coding performance. In the related art, on the one hand, a neural network filtering model is switchable at the coding tree unit level, and different neural network filtering models are obtained by training with different sequence-level quantization parameter values (BaseQP). The encoder side tries to use these different neural network filtering models to search the neural network filtering model with the lowest rate-distortion cost which is used as the optimal network model for the current coding tree unit. Based on a usage flag and network model index information at the coding tree unit level, the decoder side may use the same network model as the encoder side for filtering. On the other hand, for different test conditions and quantization parameters, only one simplified neural network filtering model with low-complexity is enough for in-loop filtering. In a case where a neural network filtering model with low-complexity is employed for filtering, quantization parameter information is added as an additional input, that is, the quantization parameter information is used as an input of a network to improve a generalization capability of the neural network filtering model, so as to achieve good coding performance without switching the neural network filtering model.

However, when filtering is performed by switching the neural network filtering model at the coding tree unit level, since each coding tree unit corresponds to a neural network filtering model once, the hardware implementation is highly complex and has a large overhead. When a low-complexity neural network filtering model is used for filtering, the selection during filtering is not flexible enough due to the influence of quantization parameters, and there are still few choices during encoding and decoding, which cannot achieve a good encoding and decoding effect.

SUMMARY

The technical solutions of the embodiments of the present application may be implemented as follows.

In a first aspect, an embodiment of the present application provides a filtering method, which is applied to a decoder, and the method includes:

- parsing a bitstream to obtain a frame-level usage flag, where the frame-level usage flag is used to indicate whether a neural network filtering is enabled for a current frame;
- in response to that the frame-level usage flag indicates that the neural network filtering is enabled for the current frame, obtaining a frame-level control flag and a frame-level quantization parameter adjustment flag; where the frame-level control flag is used to determine whether filtering is applied to all blocks in the current frame, and the frame-level quantization parameter adjustment flag is used to indicate whether a quantization parameter is adjusted for the current frame;
- in response to that the frame-level control flag indicates that the neural network filtering is applied to all blocks in the current frame, and that the frame-level quantization parameter adjustment flag indicates that the quantization parameter is adjusted for the current frame, obtaining an adjusted frame-level quantization parameter; and
- filtering a current block in the current frame based on the adjusted frame-level quantization parameter and a neural network filtering model to obtain first residual information of the current block.

In a second aspect, an embodiment of the present application provides a filtering method, which is applied to an encoder, and the method includes:

- obtaining a sequence-level enabled flag;
- in response to that the sequence-level enabled flag indicates that neural network based in-loop filtering is allowed to be used, obtaining an original value of a current block in a current frame, a reconstructed value of the current block, and a frame-level quantization parameter;
- performing filtering estimation on the current block based on a neural network filtering model, the reconstructed value of the current block and the frame-level quantization parameter to determine a first reconstructed value;
- performing rate-distortion cost estimation based on the first reconstructed value and the original value of the current block to obtain a rate-distortion cost of the current block, and traversing the current frame to determine a first rate-distortion cost of the current frame;
- performing filtering estimation on the current frame based on the neural network filtering model, at least one frame-level quantization offset parameter, the frame-level quantization parameter, and the reconstructed value of the current block in the current frame at least once to determine at least one second rate-distortion cost of the current frame; and determining a frame-level quantization parameter adjustment flag based on the first rate-distortion cost and the at least one second rate-distortion cost.

In a third aspect, an embodiment of the present application provides a decoder, and the decoder includes:

a parsing portion, configured to parse a bitstream to obtain a frame-level usage flag, where the frame-level usage flag is used to indicate whether a neural network filtering is enabled for a current frame;

a first determination portion, configured to obtain a frame-level control flag and a frame-level quantization parameter adjustment flag in response to that the frame-level usage flag indicates that the neural network filtering is enabled for the current frame; where the frame-level control flag is used to determine whether the neural network filtering is applied to all blocks in the current frame, and the frame-level quantization parameter adjustment flag is used to indicate whether a quantization parameter is adjusted for the current frame;

a first adjustment portion, configured to obtain an adjusted frame-level quantization parameter in response to that the frame-level control flag indicates that the neural network filtering is applied to all blocks in the current frame and that the frame-level quantization parameter adjustment flag indicates that the quantization parameter is adjusted for the current frame; and a first filtering portion, configured to filter a current block in the current frame based on the adjusted frame-level quantization parameter and a neural network filtering model to obtain first residual information of the current block.

In a fourth aspect, an embodiment of the present application provides an encoder, and the encoder includes:

a second determination portion, configured to obtain a sequence-level enabled flag, and to obtain an original value of a current block in a current frame, a reconstructed value of the current block, and a frame-level quantization parameter in response to that the sequence-level enabled flag indicates that neural network based in-loop filtering is allowed to be used; and a second filtering portion, configured to perform filtering estimation on the current block based on a neural network filtering model, the reconstructed value of the current block and the frame-level quantization parameter to determine a first reconstructed value; where the second determination portion is further configured to perform rate-distortion cost estimation based on the first reconstructed value and the original value of the current block to obtain a rate-distortion cost of the current block, and to traverse the current frame to determine a first rate-distortion cost of the current frame;

the second filtering portion is further configured to perform filtering estimation on the current frame based on the neural network filtering model, at least one frame-level quantization offset parameter, the frame-level quantization parameter, and the reconstructed value of the current block in the current frame at least once, to determine at least one second rate-distortion cost of the current frame; and the second determination portion is further configured to determine a frame-level quantization parameter adjustment flag based on the first rate-distortion cost and the at least one second rate-distortion cost.

In a fifth aspect, an embodiment of the present application further provides a decoder, and the decoder includes:

a first memory, configured to store a computer program executable on a first processor; and the first processor, configured to perform the method described in the first aspect when the computer program is executed.

In a sixth aspect, an embodiment of the present application further provides an encoder, and the encoder includes:

a second memory, configured to store a computer program executable on a second processor; and the second processor, configured to perform the method described in the second aspect when the computer program is executed.

In a seventh aspect, an embodiment of the present application provides a non-transitory computer-readable storage medium. The non-transitory computer-readable storage medium stores a computer program. The computer program, when executed on a first processor, causes the method described in the first aspect to be implemented, or the computer program, when executed on a second processor, causes the method described in the second aspect to be implemented.

In an eighth aspect, a bitstream is provided. The bitstream includes computer program instructions and is stored in a non-transitory computer computer-readable storage medium, and the computer program instructions, when executed on a processor, cause a decoder to perform the filtering method in the first aspect.

In a ninth aspect, a bitstream is provided. The bitstream includes computer program instructions and is stored in a non-transitory computer computer-readable storage medium, and the computer program instructions, when executed on a processor, cause a encoder to perform the filtering method in the second aspect.

DETAILED DESCRIPTION

In the embodiments of the present application, a digital video compression technology is mainly used to compress the huge digital picture video data for the convenience of transmission and storage. With the proliferation in Internet videos and people's increasing demand for video clarity, although the existing digital video compression standards can save a lot of video data, there is still a need to pursue better digital video compression technology to reduce the bandwidth and traffic pressure of digital video transmission.

In the digital video encoding process, an encoder reads unequal pixels for original video sequences of different colour formats, including luma components and chroma components, that is, the encoder reads a monochrome picture or colour picture. Then it is partitioned into blocks and the blocks are encoded by the encoder. The encoder usually uses a hybrid frame coding mode, which generally includes intra-frame and inter prediction, transformation and quantization, inverse transform and inverse quantization, in-loop filter and entropy coding. Intra prediction only refers to information of the same frame picture, predicts pixel information within the paritioned current block, which is used to eliminate spatial redundancy. Inter prediction can refer to the picture information of different frames, and use motion estimation to search motion vector information that best matchs the current block of division, to eliminate temporal redundancy; transformation and quantization convert a predicted picture block to a frequency domain, redistribute the energy, and combine with quantization to remove information that the human eye is not sensitive to, to eliminate visual redundancy; entropy coding can eliminate character redundancy based on a current context model and probability information of a binary bitstream; in-loop filter mainly processes pixels after inverse transform and inverse quantization to compensate for distortion information and provide a better reference for subsequent encoded pixels.

At present, the scenario in which filtering processing can be performed may be a reference software test platform HPM based on AVS or a versatile video coding (VVC) reference software test platform (VTM) based on VVC, which is not limited in the embodiments of the present application.

In a video picture, a first colour component, a second colour component, and a third colour component are generally used to represent a current block (for example, coding block (CB)). The three colour components are respectively a luma component, a blue chroma component, and a red chroma component. The luma component is generally denoted by the symbol Y, the blue chroma component is generally denoted by the symbol Cb or U, and the red chroma component is generally denoted by the symbol Cr or V. In this way, the video picture can be expressed in a YCbCr format or a YUV format.

Figure 1A:
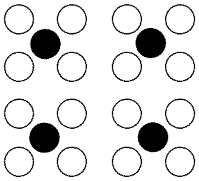
FIGS. 1A to 1C are schematic distribution diagrams of components in different colour formats provided in the embodiments of the present application.
Figure 1B:
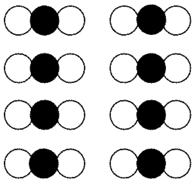
Figure 1C:
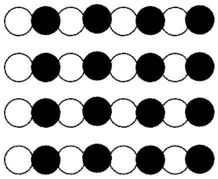

Generally, digital video compression technology is applied to picture data with YCbCr (YUV) colour coding method. YUV ratio is generally 4:2:0, 4:2:2, or 4:4:4. Y represents luma, Cb (U) represents blue chroma, Cr (V) represents red chroma, and U and V represent chroma, for describing colour and saturation. FIGS. 1 A to 1 C illustrate diagrams of distribution of various components in different colour formats, where the Y component is white and the UV components are black gray. As illustrated in FIG. 1 A, in colour format, 4:2:0 denotes four luma components and two chroma components (YYYYCbCr) per four pixels, as illustrated in FIG. 1 B, 4:2:2 denotes four luma components and four chroma components (YYYYCbCrCbCr) per four pixels, and as illustrated in FIG. 1 C, 4:4:4 denotes a full pixel display (YYYYCbCrCbCrCbCrCbCr).

At present, the general video coding standards are based on block-based hybrid coding architecture. Each frame in the video picture is partitioned into square largest coding units (LCUs) of the same size (such as 128×128, or 64×64), and each largest coding unit may be partitioned into a rectangular coding unit (CU) according to rules. Moreover, the coding unit may be partitioned into smaller prediction units (PU). Specifically, the hybrid coding architecuture may include modules like prediction, transform, quantization, entropy coding, in-loop filter. The prediction module may include intra prediction and inter prediction, and the inter prediction may include motion estimation and motion compensation. Since there is a strong correlation between neighbouring samples in one frame of a video picture, intra prediction can eliminate the spatial redundancy between neighbouring samples in video coding technology. For inter prediction, picture information of different frames may be referenced, and motion estimation is used to search for motion vector information that best matches the current partition block, to eliminate temporal redundancy. For the transformation, the predicted picture block is transformed into the frequency domain, the energy is redistributed, and information insensitive to human eyes can be removed in combination with quantization, which is used to eliminate visual redundancy. The entropy coding can eliminate character redundancy according to the current context model and the probability information of a binary bitstream.

Figure 2:
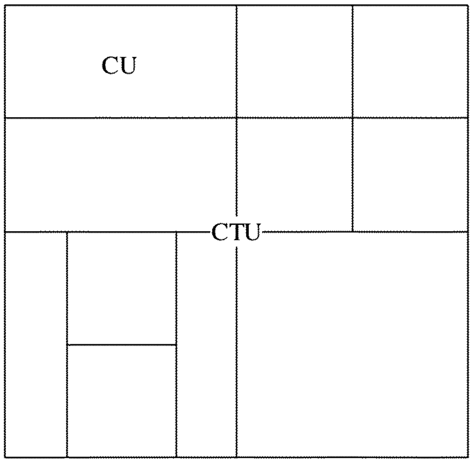
FIG. 2 is a schematic diagram illustrating partition of an exemplary coding unit provided in the embodiments of the present application.

It should be noted that, in the video coding process, the encoder first reads the picture information and partitions the picture into multiple coding tree units (CTUs), and one coding tree unit can be further partitioned into multiple coding units (CUs), which may be rectangular blocks or square blocks. For the specific relationship, reference may be made to FIG. 2.

In the inter prediction process, for the current coding unit, the information of reference blocks of different pictures is not considered for prediction, and only the neighbouring coding units are used as reference information for prediction. That is, for the current coding block, according to a most general encoding order from left to right and from top to bottom, the top-left coding unit, the top coding unit, and the left coding unit may be used as reference information to predict the current coding block. The current coding unit is used as reference information for the next coding unit, and so forth, prediction of the whole picture is completed. If the input digital video is in colour format, for example, the input source of the current mainstream digital video encoder is in YUV 4:2:0 format, that is, every four pixels of the picture are composed of four Y components and two UV components. The encoder encodes the Y component and the UV components respectively, and the coding tools and technologies adopted are slightly different, and meanwhile the decoder also performs decoding according to different formats.

For the inter prediction part of digital video coding/decoding, the coding block in the current frame is mainly predicted by referring to the neighbouring picture information of the current frame, which includes: calculating the residual between the predicted block and the original picture block, and transporting the residual information to the decoder side via processes such as transformation, and quantization, after obtaining the residual information. After receiving and parsing a bitstream, the decoder side obtains residual information by steps such as inverse transform, and inverse quantization, and adds the residual information to a predicted picture block obtained by the decoder side to obtain a reconstructed picture block.

Current general video coding and decoding standards (such as H.266/VVC) all adopt a block-based hybrid coding architecture. Each frame in a video is partitioned into square largest coding units (LCUs) of the same size (such as 128×128, 64×64, etc.). Each largest coding unit may be partitioned into rectangular coding units (CUs) according to a rule. The coding unit may be further partitioned into prediction units (PUs), transform units (TUs), etc. The hybrid coding architecture includes mldules such as prediction, transform, quantization, entropy coding, and in-loop filter. The prediction module includes intra prediction and inter prediction. The inter prediction includes motion estimation and motion compensation. Since there is a strong correlation between neighbouring samples in one frame of a video, intra prediction method used in video coding technology can eliminate the spatial redundancy between neighbouring samples. Since there is a strong similarity between neighbouring frames of a video, intrer prediction method used in video coding technology can eliminate the temporal redundancy between neighbouring frames, thereby improving the coding efficiency.

The basic process of video encoder/decoder is as follows. At the encoder side, a frame of a picture is partitioned into blocks, and intra prediction or inter prediction is applied to the current block to generate a prediction block of the current block. The prediction block is subtracted from an original picture block of the current block to obtain a residual block, the residual block is transformed and quantized to obtain a quantization coefficient matrix, and the quantization coefficient matrix is entropy encoded and output into a bitstream. At the decoder side, intra prediction or inter prediction is applied to the current block to generate a prediction block of the current block. In addition, the bitstream is parsed to obtain a quantization coefficient matrix, and inverse quantization and inverse transform are applied to the quantization coefficient matrix to obtain a residual block. The prediction block and the residual block are added together to obtain a reconstructed block. Reconstructed blocks constitute a reconstructed picture. Based on a picture or a block, the in-loop filtering is applied to the reconstructed picture to obtain a decoded picture. The encoder side also needs to perform operations similar to those of the decoder side to obtain the decoded picture. The decoded picture can be used as a reference frame for inter prediction for subsequent frames. At the encoder side, determined block partitioning information and prediction, transformation, quantization, entropy coding and in-loop filtering need to be output into the bitstream if necessary. The decoder side determines the same block partitioning information and mode information or parameter information about prediction, transformation, quantization, entropy coding and in-loop filtering as the encoder side by parsing and analyzing existing information, thereby ensuring that the decoded picture obtained by the encoder side is the same as the decoded picture obtained by the decoder side. The decoded picture obtained at the encoder side is also referred as the reconstructed picture. The current block may be partitioned into prediction units during prediction, and may be partitioned into transforma units during transformation. The partition of the prediction units and the transforma units may be different. The above is the basic process of the video encoder/decoder under the block-based hybrid coding architecture. With the development of technology, some modules or steps in the architecture or process may be optimized. The current block may be a current coding unit (CU), a current prediction unit (PU), etc.

The international video coding standards development organization JVET, has established two exploratory experimental teams, which focus on an exploratory experiment based on the neural network coding and an exploratory experiment beyond VVC, respectively, and has also established several corresponding expert discussion teams.

The above-mentioned exploratory experiment beyond VVC aims to explore higher coding efficiency based on the latest coding standard H.266/VVC with strict performance and complexity requirements. The coding method studied by this team is closer to VVC and may be called a traditional coding method. At present, the performance of the algorithm reference model in this exploratory experiment has surpassed the latest VVC reference model VTM by about 15%.

The method studied by the first exploratory experimental team is an intelligent coding method based on neural networks. Currently, deep learning and neural networks are hot topics in all walks of life, especially in the field of computer vision. Methods based on deep learning often have overwhelming advantages. Experts from the JVET standards organization brought neural networks into the field of video coding and decoding. With the powerful learning ability of neural networks, coding tools based on neural networks often have very high coding efficiency. In the early stages of VVC standard formulation, many companies set their sights on deep learning-based coding tools and proposed methods including intra prediction modes based on neural networks, inter prediction modes based on neural networks, and in-loop filtering methods based on neural networks. The coding performance of the in-loop filtering method based on neural networks is the most outstanding, and after a lot of research and exploration over many meetings, the coding performance of the method can reach more than 8%. The coding performance of the in-loop filtering solution based on neural networks studied by the first exploratory experimental team of the JVET meeting has reached as high as 12%, which is almost contribute to half a generation of coding performance.

On the basis of the exploratory experiments of the current JVET meeting, the embodiments of the present application intend to propose an in-loop filtering enhancement solution based on neural networks. The neural network based in-loop filtering solution currently used in the JVET meeting will be introduced briefly first below, and then the improved method of the embodiments of the present application will be introduced in detail.

At recent JVET meeting, the exploration of the in-loop filtering enhancement solution based on neural networks is mainly focused on two forms. The first is a multi-model intra-frame switchable solution, and the second is an intra-frame non-switchable model solution. But no matter which solution is adopted, the architecture of the neural network is not changed much, and the tool is used in the in-loop filtering of the traditional hybrid coding architecture. Therefore, the basic processing unit in both solutions is the coding tree unit, that is, the largest coding unit size.

The most significant difference between the first solution, i.e., multi-model intra-frame switchable solution, and the second solution, i.e., intra-frame non-switchable model solution, is that when encoding and decoding the current frame, the first solution supports switch of the neural network model at will, while the second solution do not support switch of the neural network model. Taking the first solution as an example, during coding of a picture, each coding tree unit has multiple optional candidate neural network models. The encoder selects which neural network model is used for the current coding tree unit for the best filtering effect, and then encodes the neural network model index into the bitstream. That is, in this solution, if the coding tree unit needs to be filtered, it is necessary to first transmit a coding tree unit-level usage flag and then transmit the neural network model index. If filtering is not required, it is only necessary to transmit a coding tree unit level usage flag. After parsing the index value, the decoder side employs the neural network model corresponding to the index to the current coding tree unit to filter the current coding tree unit.

Taking the second solution as an example, during coding of a picture, the available neural network model for each coding tree unit in the current frame is fixed, and each coding tree unit uses the same neural network model. That is, in the second solution, there is no model selection process at the encoder side. The decoder side obtains the usage flag indicating whether the current coding tree unit uses the neural network based in-loop filtering by parsing. If the usage flag is true, the preset model (the same as the encoder side) is used to filter the coding tree unit. If the usage flag is false, no additional operation is performed.

The first solution, i.e., multi-model intra-frame switchable solution, has strong flexibility at the coding tree unit level and can adjust the model according to local details, that is, achieve a better global effect through local optimization. Generally, lots of neural network models need to be used in this solution, as for JVET general test conditions, different neural network models are trained under different quantization parameters, and different encoded frame types may also require different neural network models to achieve a better effect. Taking filter 1 of the JVET-Y0080 solution as an example, the filter uses up to 22 neural network models to cover different encoded frame types and different quantization parameters, and the model switching is performed at the coding tree unit level. This filter can provide up to 10% more coding performance based on the existing VVC.

For the second solution, i.e., intra-frame non-switchable model solution, JVET-Y0078 is taken as an example. Although this solution has two neural network models overall, the model is not switchable within a frame. In this solution, a determination is performed at the encoder side, and if the current encoded frame type is an I-frame, the neural network model corresponding to the I-frame is imported, only this model is used in the current frame; or if the current encoded frame type is a B-frame, the neural network model corresponding to the B-frame is imported, and similarly, only the neural network model corresponding to the B-frame is used in this frame. This solution can provide 8.65% coding performance based on the existing VVC. Although it is slightly lower than the first solution, the overall performance is a coding efficiency that is almost impossible to achieve compared to traditional coding tools.

The first solution has higher flexibility and better encoding performance, but it has a fatal flaw in hardware implementation. At the recent JVET meeting, it was discussed that hardware experts are concerned about the code for intra-frame model switching. Switching the model at the coding tree unit level means that in the worst case, the decoder needs to reload the neural network model every time it processes a coding tree unit, and the hardware implementation complexity is not evnen taken into account, which is already an additional burden on existing high-performance GPUs. In addition, the existence of multiple models also means that a large number of parameters need to be stored, which is also a huge overhead burden on current hardware implementation.

However, with regard to the second solution, in such neural network in-loop filtering solution, the powerful generalization ability of deep learning is further explored. It takes various information as input instead of simply taking the reconstructed sample as the input of the model. More information provides more help for the learning of the neural network, so that the generalization ability of the model is better reflected and many unnecessary redundant parameters are removed. The solution was continuously updated until the last meeting, and may use only one simplified neural network model with low-complexity to adapt different test conditions and quantitative parameters. Compared to the first solution, the solution saves the time of constantly reloading the model and the need to open up a larger storage space for a large number of parameters.

The above is a simple comparison of the advantages and disadvantages of the two solutions. Next, the architecture of the neural network solution will be introduced.

Figure 3A:
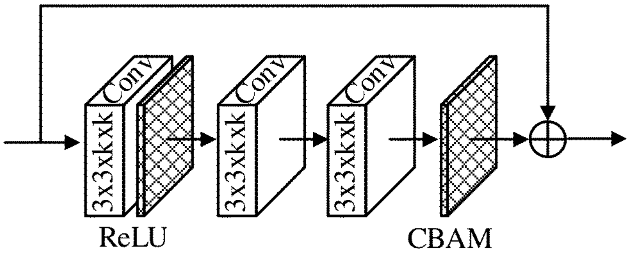
FIG. 3A is a first structural diagram of an exemplary neural network filtering model provided in the embodiments of the present application.
Figure 3B:
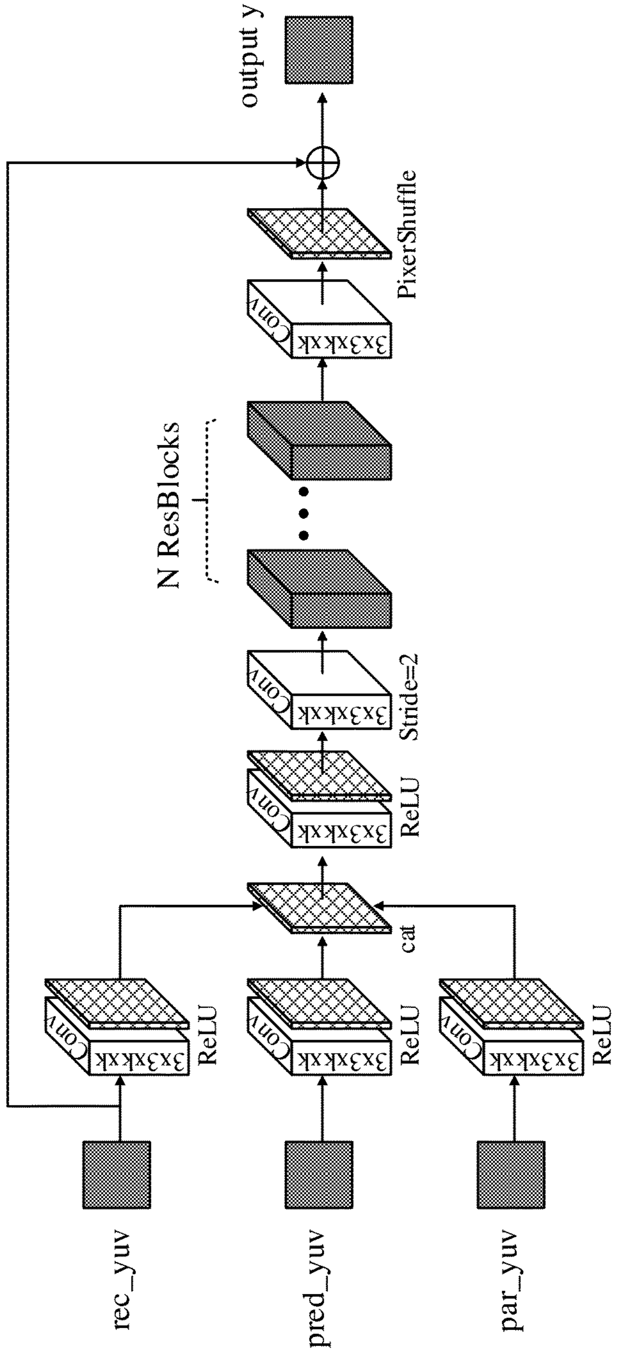
FIG. 3B is a second structural diagram of an exemplary neural network filtering model provided in the embodiments of the present application.

JVET-Y0080 is taken as an example of the model architecture for the first solution, and the simple network architecture is shown in FIG. 3B below.

It can be seen that the main branch of the network is formed by multiple ResBlocks, and the structure of a ResBlock is shown in FIG. 3A. A single ResBlock consists of multiple convolutional layers connected to a CBAM layer. A convolutional blocks attention module (CBAM) is an attention mechanism module, which is mainly responsible for further extraction of detail features. In addition, ResBlocks also have a direct skip connection structure at the input and output. There is also a skip connection in the entire network architecture, which connects the input reconstructed YUV information with the shuffled output.

The input of the network mainly includes reconstructed YUV (rec), predicted YUV (prde) and YUV with partition information (par). After simple convolution and activation operations, all inputs are stitched, and the stitched inputs are provided to the main branch of the network. It is worth noting that the YUV with partition information may be processed differently in I-frame and B-frame. I-frame needs to input YUV with partition information while B-frame does not need to input YUV with partition information.

In summary, for any of I-frame and B-frame, JVET requires common test quantization parameter points. The first solution has a corresponding neural network parameter model. In addition, because the three components YUV are mainly composed of brightness and chrominance two channels, for different colour components, the neural network parameter models are different.

JVET-Y0078 is taken as an example of the model architecture for the second solution. The simple network architecture is shown in FIG. 4 below.

It can be seen that the first solution and the second solution are basically the same in terms of the main branch of the network. The difference is that compared with the first solution, the second solution adds quantization parameter information as additional input. In the above-mentioned first solution, different neural network parameter models are loded according to different quantization parameter information to achieve more flexible processing and more efficient coding effects, while in the second solution, the quantization parameter information is used as the input of the network to improve the generalization ability of the neural network, so that the model can adapt to different quantization parameter conditions and provide good filtering performance.

Figure 4:
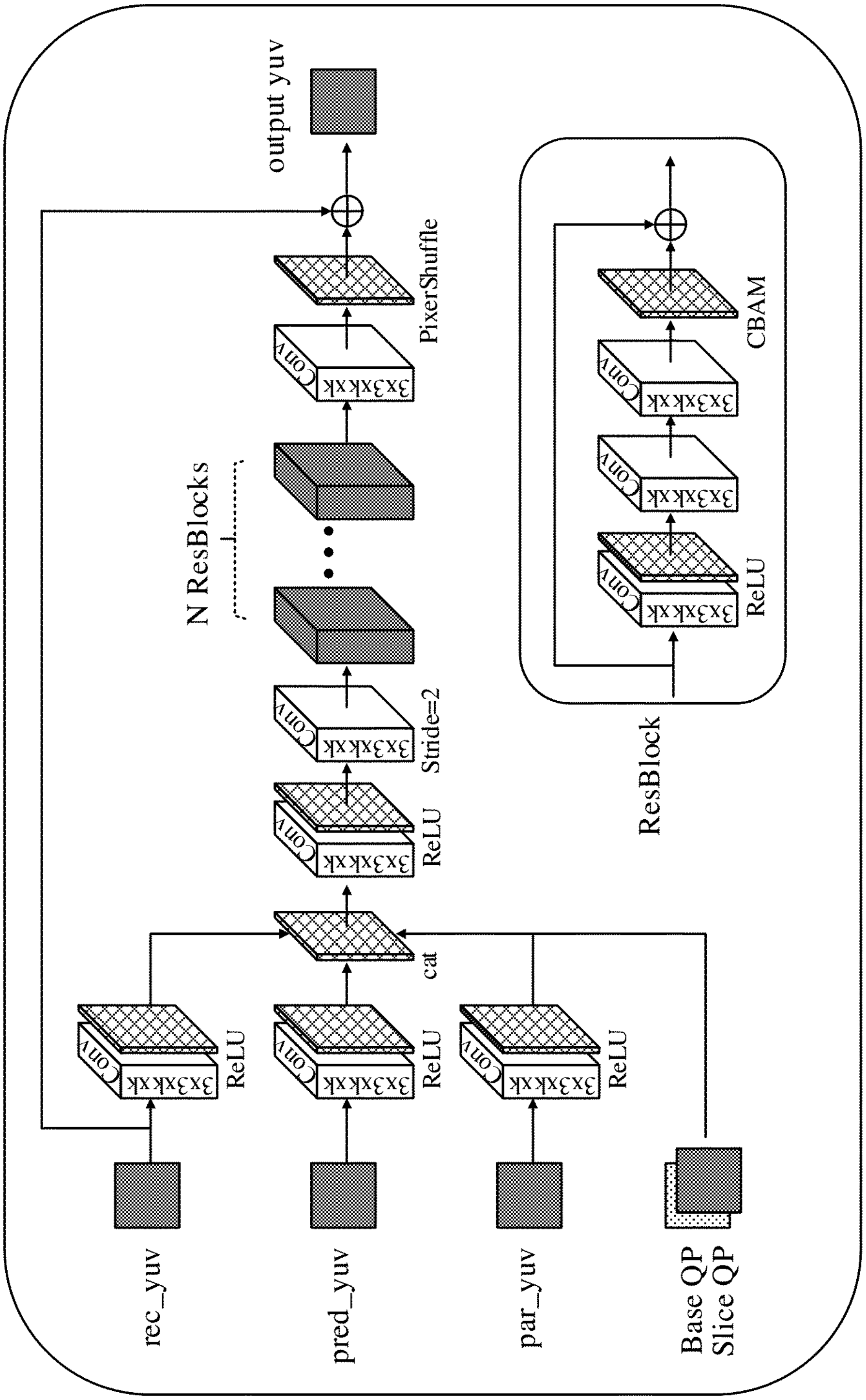
FIG. 4 is a third structural diagram of an exemplary neural network filtering model provided in the embodiments of the present application.

As shown in FIG. 4, two quantization parameters as inputs are input into the network, one is BaseQP and the other is SliceQP. BaseQP indicates a sequence-level quantization parameter set by the encoder during coding of a video sequence, that is, the quantization parameter point required by the JVET common test is also the parameter used to select the neural network model in the first solution. SliceQP is the quantization parameter of the current frame. The quantization parameter of the current frame may be different from the sequence-level quantization parameter. This is because in the video coding process, the quantization condition for B-frame is different from that for I-frame, and quantization parameters are different at different time domain levels. Therefore, SliceQP is generally different from BaseQP in the B-frame. Therefore, in the design of JVET-Y0078, the input of the neural network model for I-frame only requires SliceQP, while the neural network model for B-frame requires both BaseQP and SliceQP as inputs.

The second solution is also different from the first solution in one aspect, which is that the output of the model in the first solution generally does not require additional processing. That is, if the output of the model is residual information, the residual information is added to the reconstructed sample of the current coding tree unit to serve as the output of the neural network based in-loop filtering tool; if the output of the model is a complete reconstructed sample, the output of the model is the output of the neural network based in-loop filtering tool. However, in the second solution, the output generally needs to be scaled. Taking the residual information as an example of the output of the model, the model performs reasoning and outputs the residual information of the current coding tree unit. The residual information is scaled and then added to the reconstructed sample information of the current coding tree unit. The scaling factor is obtained by the encoder side and needs to be encoded into the bitstream and provided to the decoder side.

It is precisely because the quantization parameter is used as additional input, the number of models is reduced, which has become the most popular solution at the current JVET meeting.

In addition, the general neural network based in-loop filtering solution may not be exactly the same as the above two solutions. Although the specific details of the solution may be different, the main ideas are basically the same. For example, the different details of the second solution may be reflected in the design of the neural network architecture, such as the convolution size of ResBlock, the number of convolution layers, and whether the attention module is included, or may be reflected in the input of the neural network, for example, even more additional information may serve as input, such as a value of a deblocking filtering boundary strength.

In the first solution, the neural network model is switchable at the coding tree unit level. Different neural network models are obtained through trainings according to different BaseQPs. The encoder tries to use these different neural network models to search a network model with the lowest rate-distortion cost, which is the optimal network model for the current coding tree unit. Based on a usage flag and network model index information at the coding tree unit level, the decoder side may use the same network model as the encoder side for filtering. In the second solution, the operation of inputting the quantization parameter can achieve good coding performance without switching models, which preliminarily solves the concerns about hardware implementation. However, the performance of the second solution is still not as good as the first solution. The main defect is that, in terms of the switching of BaseQP, the second solution has no flexibility, and thus, there is less selection for the encoder side, resulting in failure to achieve optimal performance.

Figure 5:
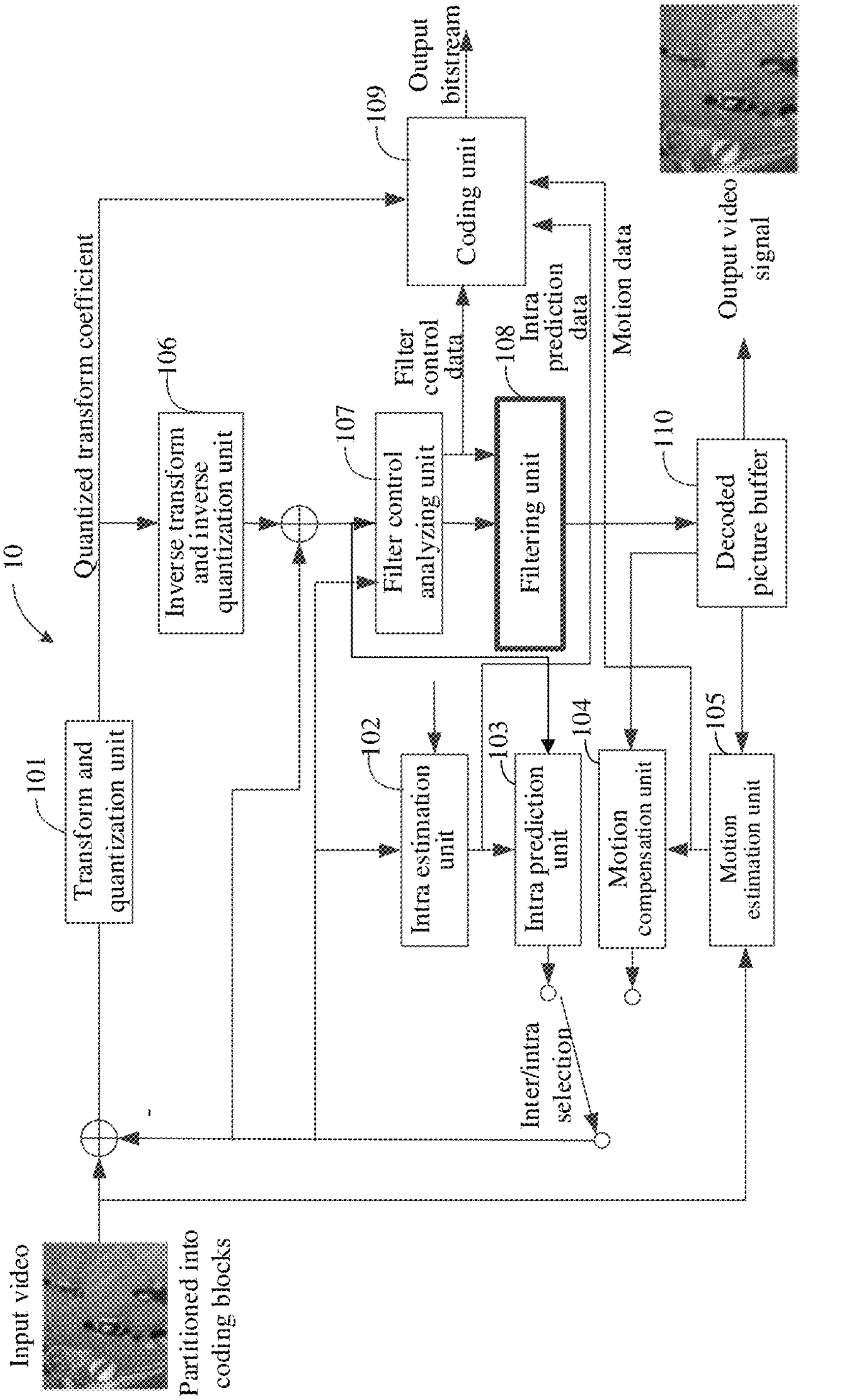
FIG. 5 is a structural diagram of an exemplary video coding system provided in the embodiments of the present application.

The embodiments of the present application provide a video coding system, and FIG. 5 is a schematic structural diagram of the video coding system provided in the embodiments of the present application. The video coding system 10 may include a transform and quantization unit 101, an intra estimation unit 102, an intra prediction unit 103, a motion compensation unit 104, a motion estimation unit 105, an inverse transform and inverse quantization unit 106, a filter control analyzing unit 107, a filtering unit 108, a coding unit 109, a decoded picture buffer 110, etc. The filtering unit 108 may implement DBF filtering/SAO filtering/ALF filtering. The coding unit 109 may implement header information coding and context-based adaptive binary arithmetic coding (CABAC). For an input original video signal, a video coding block may be obtained through coding tree unit (CTU) partitioning. Then, residual pixel information of the video coding block obtained through intra prediction or inter prediction may be transformed using the transform and quantization unit 101. The transform may include transforming residual information in a pixel domain into residual information in a transform domain, and quantizing an obtained transform coefficient to further reduce a bit rate. The intra estimation unit 102 and the intra prediction unit 103 may be configured to perform intra prediction on the video coding block. Specifically, the intra estimation unit 102 and the intra prediction unit 103 may be configured to determine an intra prediction mode to be used to encode the video coding block. The motion compensation unit 104 and the motion estimation unit 105 may be configured to perform inter prediction coding on a received video coding block with respect to one or more blocks in one or more reference pictures to provide time prediction information. Motion estimation performed by the motion estimation unit 105 is a process of generatin a motion vector. Then, the motion compensation unit 104 may perform motion compensation based on the motion vector determined by the motion estimation unit 105. After the intra prediction mode has been determined, the intra prediction unit 103 may further be configured to provide selected intra prediction data to the encoding unit 109. The motion estimation unit 105 may also send computed motion vector data to the encoding unit 109. In addition, the inverse transform and inverse quantization unit 106 may be configured to reconstruct the video coding block, which includes: reconstructing a residual block in the pixel domain and providing the reconstructed residual block to the filter control analyzing unit 107 and the filtering unit 108 to remove a blocking artifact, and adding the reconstructed residual block to a predictive block in a picture in the decoded picture buffer 110, to produce a reconstructed video coding block. The coding unit 109 may be configured to encode various coding parameters and quantized transform coefficients. Context content in a coding algorithm based on CABAC may be based on a neighbouring coding block. The coding unit 109 may be further configured to encode information indicating the determined intra prediction mode and output a bitstream of the video signal. The decoded picture buffer 110 may be configured to store the reconstructed video coding block for prediction reference. As video picture coding progresses, new reconstructed video coding blocks are generated continuously, these reconstructed video coding blocks may all be stored in the decoded picture buffer 110.

Figure 6:
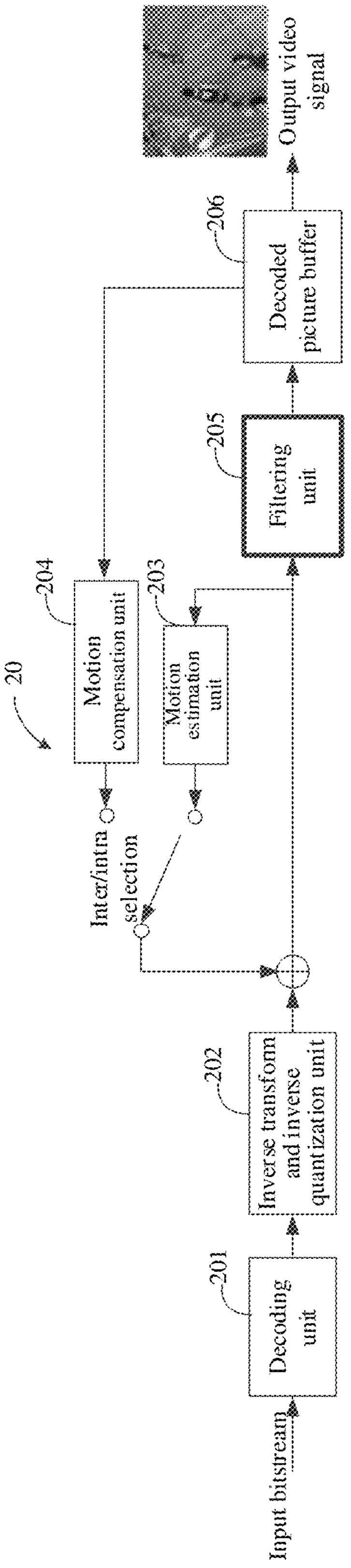
FIG. 6 is a structural diagram of an exemplary video decoding system provided in the embodiments of the present application.

The embodiments of the present application provide a video decoding system, and FIG. 6 is a schematic structural diagram of the video decoding system provided in the embodiments of the present application. The video decoding system 20 may include: a decoding unit 201, an inverse transform and inverse quantization unit 202, an intra prediction unit 203, a motion compensation unit 204, a filtering unit 205, a decoded picture buffer 206, etc. The decoding unit 201 may implement header information decoding and CABAC decoding. The filtering unit 205 may implement DBF filtering/SAO filtering/ALF filtering. After the input video signal has gone through coding processing shown in FIG. 5, the bitstream of the video signal may be output. The bitstream may be input to the video decoding system 20, and first go through the decoding unit 201 to obtain a decoded transform coefficient. The transform coefficient may be processed by the inverse transform and inverse quantization unit 202, to generate a residual block in the pixel domain. The intra prediction unit 203 may be configured to generate predicted data of the current current video coding block based on the determined intra prediction mode and data of a decoded block from the current frame or picture. The motion compensation unit 204 may determine prediction information configured for a video coding block by analyzing a motion vector and another associated syntax element, and generate a predictive block of the video coding block being decoded using the prediction information. The residual block from the inverse transform and inverse quantization unit 202 and a corresponding predictive block generated by the intra prediction unit 203 or the motion compensation unit 204 may be summed to form a decoded video block. The decoded video signal may be provided to the filtering unit 205 to remove a blocking artifact, which may improve video quality. Then, the decoded video block may be stored in the decoded picture buffer 206. The decoded picture buffer 206 may store a reference picture configured for subsequent intra prediction or motion compensation, and may also be configured to output the video signal, thus recovering the original video signal.

It should be noted that the filtering method provided in the embodiments of the present application may be applied to the filtering unit 108 shown in FIG. 5 (denoted by a black bold box), as well as the filtering unit 205 shown in FIG. 6 (denoted by a black bold box). That is to say, the filtering method in the embodiments of the present application may be applied to a video coding system ("encoder" for short) or a video decoding system ("decoder" for short), and may even be applied to both the video coding system and the video decoding system, which is not limited in any way.

The embodiments of the present application may be implemented on the basis of the above-mentioned intra-frame non-switchable model solution. The main conception is to use the variability of the input information to provide more possibilities for the encoder. The input information of the neural network filtering model includes a quantization parameter, and the quantization parameter include a sequence-level quantization parameter value (BaseQP) or a frame-level quantization parameter value (SliceQP). The BaseQP and SliceQP used as inputs are adjusted so that the encoder side has more options to attempt, thereby improving the encoder efficiency.

Based on the relevant technical solutions described in the above, the embodiments of the present application provide a filtering method, which will be described in detail in the following.

In a first clause, a filtering method is provided, which applied to a decoder, and the method includes:

parsing a bitstream to obtain a frame-level usage flag, where the frame-level usage flag is used to indicate whether a neural network filtering is enabled for a current frame;

in response to that the frame-level usage flag indicates that the neural network filtering is enabled for the current frame, obtaining a frame-level control flag and a frame-level quantization parameter adjustment flag; where the frame-level control flag is used to determine whether the neural network filtering is applied to all blocks in the current frame, and the frame-level quantization parameter adjustment flag is used to indicate whether a quantization parameter is adjusted for the current frame;

in response to that the frame-level control flag indicates that the neural network filtering is applied to all blocks in the current frame, and that the frame-level quantization parameter adjustment flag indicates that the quantization parameter is adjusted for the current frame, obtaining an adjusted frame-level quantization parameter; and filtering a current block in the current frame based on the adjusted frame-level quantization parameter and a neural network filtering model to obtain first residual information of the current block.

In a second clause, according to the first clause, the method further includes:

in response to that the frame-level control flag indicates that the neural network filtering is only applied to a portion of blocks in the current frame, obtaining a block-level usage flag;

in response to that the block-level usage flag indicates that the neural network filtering is applied to any one colour component of the current block, and that the frame-level quantization parameter adjustment flag indicates that the quantization parameter is adjusted for the current frame, obtaining an adjusted frame-level quantization parameter; and filtering the current block in the current frame based on the adjusted frame-level quantization parameter and the neural network filtering model to obtain first residual information of the current block.

In a third clause, according to the second clause, after obtaining the block-level usage flag, the method further includes:

obtaining a block-level quantization parameter adjustment flag;

in response to that the block-level usage flag indicates that the neural network filtering is applied to any one colour component of the current block and that the block-level quantization parameter adjustment flag indicates that a quantization parameter is adjusted for the current block, obtaining an adjusted block-level quantization parameter; and filtering the current block in the current frame based on the adjusted block-level quantization parameter and the neural network filtering model to obtain second residual information of the current block.

In a fourth clause, according to the second clause, after obtaining the block-level usage flag, the method further includes:

in response to that the block-level usage flag indicates that the neural network filtering is applied to any one colour component of the current block, obtaining a block-level quantization parameter corresponding to the current block; and filtering the current block in the current frame based on the block-level quantization parameter corresponding to the current block and the neural network filtering model to obtain second residual information of the current block.

In a fifth clause, according to any one of the first to the fourth clause, after parsing the bitstream to obtain the frame-level usage flag and before obtaining the adjusted frame-level quantization parameter, the method further includes:

in response to that the frame-level usage flag indicates that the neural network filtering is enabled for the current frame, and that the current frame is a first type of frame, obtaining the frame-level control flag and the frame-level quantization parameter adjustment flag.

In a sixth clause, according to the first clause or the second clause, obtaining the adjusted frame-level quantization parameter includes:

determining a frame-level quantization offset parameter based on a frame-level quantization parameter adjustment index obtained from the bitstream; and determining the adjusted frame-level quantization parameter according to an obtained frame-level quantization parameter and the frame-level quantization offset parameter.

In a seventh clause, according to the first clause or the second clause, obtaining the adjusted frame-level quantization parameter includes:

obtaining the adjusted frame-level quantization parameter from the bitstream.

In an eighth clause, according to the third clause or the fourth clause, obtaining the adjusted block-level quantization parameter includes:

determining a block-level quantization offset parameter based on a block-level quantization parameter index obtained from the bitstream; and determining the adjusted block-level quantization parameter according to an obtained block-level quantization parameter and the block-level quantization offset parameter.

In a ninth clause, according to the first clause or the second clause, before filtering the current block in the current frame based on the adjusted frame-level quantization parameter and the neural network filtering model to obtain the first residual information of the current block, the method further includes:

obtaining a reconstructed value of the current block.

In a tenth clause, according to the ninth clause, filtering the current block in the current frame based on the adjusted frame-level quantization parameter and the neural network filtering model to obtain the first residual information of the current block includes:

filtering the reconstructed value of the current block and the adjusted frame-level quantization parameter by using the neural network filtering model to obtain the first residual information of the current block.

In an eleventh clause, according to the ninth clause, before filtering the current block in the current frame based on the adjusted frame-level quantization parameter and the neural network filtering model to obtain the first residual information of the current block, the method further includes:

obtaining the reconstructed value of the current block and at least one of a prediction value of the current block, block partitioning information of the current block, or a deblocking filtering boundary strength of the current block.

In a twelfth clause, according to the eleventh clause, filtering the current block in the current frame based on the adjusted frame-level quantization parameter and the neural network filtering model to obtain the first residual information of the current block includes:

filtering the reconstructed value of the current block, the adjusted frame-level quantization parameter, and the at least one of the prediction value of the current block, the block partitioning information of the current block or the deblocking filtering boundary strength of the current block by using the neural network filtering model to obtain the first residual information of the current block.

In a thirteenth clause, according to any one of the first to the twelfth clause, after filtering the current block in the current frame based on the adjusted frame-level quantization parameter and the neural network filtering model to obtain the first residual information of the current block, or after filtering the current block in the current frame based on an adjusted block-level quantization parameter and the neural network filtering model to obtain second residual information of the current block, the method further includes:

obtaining a second residual scaling factor from the bitstream;

scaling the first residual information or second residual information of the current block based on the second residual scaling factor to obtain first target residual information or second target residual information;

determining a first target reconstructed value of the current block based on the first target residual information and a reconstructed value of the current block; or in response to that a block-level usage flag indicates that the neural network filtering is applied to any one colour component of the current block, determining a second target reconstructed value of the current block based on the second target residual information and the reconstructed value of the current block.

In a fourteenth clause, according to the thirteenth clause, the method further includes:

in response to that the block-level usage flag indicates that the neural network filtering is not applied to any colour components of the current block, determining the reconstructed value of the current block as the second target reconstructed value.

In a fifteenth clause, according to the first clause, after obtaining the frame-level usage flag, the method further includes:

obtaining a reconstructed value of the current block and at least one of a prediction value of the current block, block partitioning information of the current block, or a deblocking filtering boundary strength of the current block;

in response to that the frame-level usage flag indicates that the neural network filtering is enabled for the current frame, obtaining a frame-level control flag and a frame-level input parameter adjustment flag; where the frame-level input parameter adjustment flag indicates whether any one of the prediction value, the block partitioning information and the deblocking filtering boundary strength is adjusted;

in response to that the frame-level control flag indicates that the neural network filtering is applied to all blocks in the current frame and that the frame-level input parameter adjustment flag indicates that any one of the prediction value, the block partitioning information and the deblocking filtering boundary strength is adjusted, obtaining an adjusted block-level input parameter; and filtering the current block in the current frame based on the adjusted block-level input parameter, an obtained frame-level quantization parameter and the neural network filtering model to obtain third residual information of the current block.

In a sixteenth clause, according to the first clause, obtaining the frame-level usage flag includes:

obtaining a sequence-level enabled flag by parsing; and in response to that the sequence-level enabled flag indicates that neural network based in-loop filtering is allowed to be used, obtaining the frame-level usage flag by parsing.

In a seventeenth clause, the embodiments of the present application provide a filtering method applied to an encoder, and the method includes:

obtaining a sequence-level enabled flag;

in response to that the sequence-level enabled flag indicates that neural network based in-loop filtering is allowed to be used, obtaining an original value of a current block in a current frame, a reconstructed value of the current block, and a frame-level quantization parameter;

performing filtering estimation on the current block based on a neural network filtering model, the reconstructed value of the current block and the frame-level quantization parameter to determine a first reconstructed value;

performing rate-distortion cost estimation based on the first reconstructed value and the original value of the current block to obtain a rate-distortion cost of the current block, and traversing the current frame to determine a first rate-distortion cost of the current frame;

performing filtering estimation on the current frame based on the neural network filtering model, at least one frame-level quantization offset parameter, the frame-level quantization parameter, and the reconstructed value of the current block in the current frame at least once to determine at least one second rate-distortion cost of the current frame; and determining a frame-level quantization parameter adjustment flag based on the first rate-distortion cost and the at least one second rate-distortion cost.

In an eighteenth clause, according to the seventeenth clause, performing filtering estimation on the current frame based on the neural network filtering model, the at least one frame-level quantization offset parameter, the frame-level quantization parameter, and the reconstructed value of the current block in the current frame at least once to determine the at least one second rate-distortion cost of the current frame includes:

obtaining an i-th frame-level quantization offset parameter, and adjusting the frame-level quantization parameter based on the i-th frame-level quantization offset parameter to obtain an i-th adjusted frame-level quantization parameter; where i is a positive integer greater than or equal to 1;

performing filtering estimation on the current block based on the neural network filtering model, the reconstructed value of the current block and the i-th adjusted frame-level quantization parameter to obtain an i-th second reconstructed value; and performing rate-distortion cost estimation based on the i-th second reconstructed value and the original value of the current block, traversing all blocks in the current frame to obtain an i-th second rate-distortion cost, and performing an (i+1)-th filtering estimation based on an (i+1)-th frame-level quantization offset parameter until the rate-distortion cost estimation is completed at least once, so as to determine the at least one second rate-distortion cost of the current frame.

In a nineteenth clause, according to the seventeenth clause or the eighteenth clause, determining the frame-level quantization parameter adjustment flag based on the first rate-distortion cost and the at least one second rate-distortion cost includes:

determining a first minimum rate-distortion cost from the first rate-distortion cost and the at least one second rate-distortion cost;

if the first minimum rate-distortion cost is the first rate-distortion cost, determining that the frame-level quantization parameter adjustment flag indicates that the quantization parameter is not adjusted for the current frame; or if the first minimum rate-distortion cost is any one of the at least one second rate-distortion cost, determining that the frame-level quantization parameter adjustment flag indicates that the quantization parameter is adjusted for the current frame.

In a twentieth clause, according to any one of the seventeenth clause to the nineteenth clause, the method further includes:

in response to that the sequence-level enabled flag indicates that the neural network based in-loop filtering is allowed to be used, performing rate-distortion cost estimation based on the original value and the reconstructed value of the current block in the current frame to obtain a third rate-distortion cost.

In a twenty-first clause, according to the nineteenth clause or the twentieth clause, after determining the frame-level quantization parameter adjustment flag based on the first rate-distortion cost and the at least one second rate-distortion cost, the method further includes:

performing filtering estimation on the current block based on the neural network filtering model, the reconstructed value of the current block and the frame-level quantization parameter to determine a third reconstructed value;

performing rate-distortion cost estimation based on the third reconstructed value and the original value of the current block to obtain a fourth rate-distortion cost of the current block;

performing filtering estimation on the current block based on the neural network filtering model, a target reconstructed value corresponding to the first minimum rate-distortion cost, and the frame-level quantization parameter, to obtain a fourth reconstructed value;

performing rate-distortion cost estimation based on the fourth reconstructed value and the original value of the current block to obtain a fifth rate-distortion cost of the current block;

determining a block-level usage flag based on the fourth rate-distortion cost and the fifth rate-distortion cost; and traversing all blocks in the current frame, and determining a sum of a minimum rate-distortion cost of each of the blocks in the current frame as a sixth rate-distortion cost of the current frame.

In a twenty-second clause, according to twenty-first clause, determining the block-level usage flag based on the fourth rate-distortion cost and the fifth rate-distortion cost includes:

if the fourth rate-distortion cost is less than the fifth rate-distortion cost, determining that the block-level usage flag indicates that the neural network filtering is not applied to any colour components of the current block; or if the fourth rate-distortion cost is greater than or equal to the fifth rate-distortion cost, determining that the block-level usage flag indicates that the neural network filtering is applied to any one colour component of the current block.

In a twenty-third clause, according to the twenty-first clause or the twenty-second clause, the method further includes:

if a minimum rate-distortion cost among the third rate-distortion cost, the first minimum rate-distortion cost and the sixth rate-distortion cost is the third rate-distortion cost, determining that the frame-level usage flag indicates that the neural network filtering is not enabled for the current frame; and encoding the frame-level usage flag into a bitstream;

if the minimum rate-distortion cost among the third rate-distortion cost, the first minimum rate-distortion cost and the sixth rate-distortion cost is the first minimum rate-distortion cost, determining that the frame-level usage flag indicates that the neural network filtering is enabled for the current frame and that the frame-level control flag indicates that the neural network filtering is applied to all blocks in the current frame; and encoding the frame-level usage flag and the frame-level control flag into the bitstream; or if the minimum rate-distortion cost among the third rate-distortion cost, the first minimum rate-distortion cost and the sixth rate-distortion cost is the sixth rate-distortion cost, determining that the frame-level usage flag indicates that the neural network filtering is enabled for the current frame and that the frame-level control flag indicates that the neural network filtering is applied to a portion of blocks in the current frame; and encoding the frame-level usage flag, the frame-level control flag, and the block-level usage flag into the bitstream.

In a twenty-fourth clause, according to any one of the eighteenth to the twenty-third clause, after determining the frame-level quantization parameter adjustment flag based on the first rate-distortion cost and the at least one second rate-distortion cost, the method further includes:

if the first minimum rate-distortion cost is any one of the at least one second rate-distortion cost, encoding one frame-level quantization offset parameter, from the least one frame-level quantization offset parameter, that is corresponding to the first minimum rate-distortion cost into a bitstream, or encoding a block-level quantization parameter index of the frame-level quantization offset parameter corresponding to the first minimum rate-distortion cost into the bitstream.

In a twenty-fifth clause, according to the seventeenth clause, performing filtering estimation on the current block based on the neural network filtering model, the reconstructed value of the current block and the frame-level quantization parameter to determine the first reconstructed value includes:

for the current frame, performing filtering estimation on the current block based on the neural network filtering model, the reconstructed value of the current block and the frame-level quantization parameter to determine first estimated residual information;

determining a first residual scaling factor;

scaling the first estimated residual information by using the first residual scaling factor to obtain first scaled residual information; and adding up the first scaled residual information and the reconstructed value of the current block to determine the first reconstructed value.

In a twenty-sixth clause, according to the twenty-fifth clause, before determining the first residual scaling factor, the method further includes:

for the current frame, obtaining a reconstructed value of the current block and at least one of a prediction value of the current block, block partitioning information of the current block or a deblocking filtering boundary strength of the current block; and performing filtering estimation on the reconstructed value of the current block, the frame-level quantization parameter, and the at least one of the prediction value of the current block, the block partitioning information of the current block or the deblocking filtering boundary strength of the current block by using the neural network filtering model to obtain the first estimated residual information of the current block.

In a twenty-seventh clause, according to the twenty-fifth clause or the twenty-seventh clause, after determining the first residual scaling factor, the method further includes:

if the first minimum rate-distortion cost is the first rate-distortion cost, encoding the first residual scaling factor into a bitstream.

In a twenty-eighth clause, according to any one of the eighteenth to the twenty-third clause, performing filtering estimation on the current block based on the neural network filtering model, the reconstructed value of the current block and the i-th adjusted frame-level quantization parameter to obtain the i-th second reconstructed value includes:

performing filtering estimation on the current block based on the neural network filtering model, the reconstructed value of the current block and the i-th adjusted frame-level quantization parameter once, to obtain an i-th piece of second estimated residual information;

determining an i-th second residual scaling factor corresponding to the i-th adjusted frame-level quantization parameter;

scaling the i-th piece of second estimated residual information by using the i-th second residual scaling factor to obtain an i-th piece of second scaled residual information; and adding up the i-th piece of second scaled residual information and a corresponding reconstructed value of the current block to determine the i-th second reconstructed value.

In a twenty-ninth clause, according to twenty-eighth clause, after determining the frame-level quantization parameter adjustment flag based on the first rate-distortion cost and the at least one second rate-distortion cost, the method further includes:

if the first minimum rate-distortion cost is any one of the at least one second rate-distortion cost, encoding a second residual scaling factor corresponding to the first minimum rate-distortion cost into a bitstream.

In a thirtieth clause, according to the twenty-eighth or twenty-ninth clause, before determining the i-th second residual scaling factor corresponding to the i-th adjusted frame-level quantization parameter, the method further includes:

obtaining the reconstructed value of the current block and at least one of a prediction value of the current block, block partitioning information of the current block or a deblocking filtering boundary strength of the current block; and performing frame-level filtering estimation on the reconstructed value of the current block, the i-th adjusted frame-level quantization parameter, and the at least one of the prediction value of the current block, the block partitioning information of the current block or the deblocking filtering boundary strength of the current block by using the neural network filtering model, to obtain the i-th piece of second estimated residual information of the current block.

In a thirty-first clause, according to the seventeenth clause, performing filtering estimation on the current frame based on the neural network filtering model, the at least one frame-level quantization offset parameter, the frame-level quantization parameter, and the reconstructed value of the current block in the current frame at least once to determine the at least one second rate-distortion cost of the current frame includes includes:

in response to that the current frame is a first type of frame, performing filtering estimation on the current frame based on the current frame based on the neural network filtering model, the at least one frame-level quantization offset parameter, the frame-level quantization parameter, and the reconstructed value of the current block in the current frame at least once, to determine the at least one second rate-distortion cost of the current frame.

In a thirty-second clause, according to the twenty-first clause, after performing rate-distortion cost estimation based on the third reconstructed value and the original value of the current block to obtain the fourth rate-distortion cost of the current block, and before determining the block-level usage flag based on the fourth rate-distortion cost and the fifth rate-distortion cost, the method further includes:

performing filtering estimation on the current block based on the neural network filtering model, the reconstructed value of the current block, the at least one frame-level quantization offset parameter and the frame-level quantization parameter at least once, to determine at least one fifth reconstructed value; and determining a minimum fifth rate-distortion cost based on the at least one fifth reconstructed value and the original value of the current block.

In a thirty-third clause, according to the seventeen clause, the method further includes:

in response to that the sequence-level enabled flag indicates that the neural network based in-loop filtering is allowed to be used, obtaining the reconstructed value of the current block, the frame-level quantization parameter, and at least one of a prediction value of the current block, block partitioning information of the current block or a deblocking filtering boundary strength of the current block;

performing filtering estimation on the current block based on the neural network filtering model, the reconstructed value of the current block, the frame-level quantization parameter, and the at least one of the prediction value of the current block, the block partitioning information of the current block or the deblocking filtering boundary strength of the current block, to determine a sixth reconstructed value;

performing rate-distortion cost estimation based on the sixth reconstructed value and the original value of the current block to obtain the rate-distortion cost of the current block, and traversing the current frame to determine a seventh rate-distortion cost of the current frame;

performing filtering estimation on the current frame based on the neural network filtering model, at least one frame-level input offset parameter, the reconstructed value of the current block in the current frame, and the at least one of the prediction value of the current block, the block partitioning information of the current block or the deblocking filtering boundary strength of the current block at least once, to determine at least one eighth rate-distortion cost of the current frame; and determining a frame-level input parameter adjustment flag based on the first rate-distortion cost and the at least one eighth rate-distortion cost.

In a thirty-fourth clause, the embodiments of the present application further provide a decoder, and the decoder includes:

a parsing portion, configured to parse a bitstream to obtain a frame-level usage flag, where the frame-level usage flag is used to indicate whether a neural network filtering is enabled for a current frame;

a first determination portion, configured to obtain a frame-level control flag and a frame-level quantization parameter adjustment flag in response to that the frame-level usage flag indicates that the neural network filtering is enabled for the current frame; where the frame-level control flag is used to determine whether the neural network filtering is applied to all blocks in the current frame, and the frame-level quantization parameter adjustment flag is used to indicate whether a quantization parameter is adjusted for the current frame;

a first adjustment portion, configured to obtain an adjusted frame-level quantization parameter in response to that the frame-level control flag indicates that the neural network filtering is applied to all blocks in the current frame and that the frame-level quantization parameter adjustment flag indicates that the quantization parameter is adjusted for the current frame; and a first filtering portion, configured to filter a current block in the current frame based on the adjusted frame-level quantization parameter and a neural network filtering model to obtain first residual information of the current block.

In a thirty-fourth clause, an encoder is provided, which includes:

a second determination portion, configured to obtain a sequence-level enabled flag, and to obtain an original value of a current block in a current frame, a reconstructed value of the current block and a frame-level quantization parameter in response to that the sequence-level enabled flag indicates that neural network based in-loop filtering is allowed to be used; and a second filtering portion, configured to perform filtering estimation based on the current block based on a neural network filtering model, the reconstructed value of the current block and the frame-level quantization parameter to determine a first reconstructed value; where the second determination portion is further configured to perform rate-distortion cost estimation based on the first reconstructed value and the original value of the current block to obtain a rate-distortion cost of the current block, and to traverse the current frame to determine a first rate-distortion cost of the current frame;

the second filtering portion is further configured to perform filtering estimation on the current frame based on the neural network filtering model, at least one frame-level quantization offset parameter, the frame-level quantization parameter, and the reconstructed value of the current block in the current frame at least once, to determine at least one second rate-distortion cost of the current frame; and the second determination portion is further configured to determine a frame-level quantization parameter adjustment flag based on the first rate-distortion cost and the at least one second rate-distortion cost.

In a thirty-sixth clause, a decoder is provided, which includes:

a first memory, configured to store a computer program executable on a first processor; and the first processor, configured to perform the method according to any one of claims 1 to 16 when the computer program is executed.

In a thirty-seventh clause, an encoder is provided, which includes:

a second memory, configured to store a computer program executable on a second processor;

the second processor, configured to perform the method according to any one of claims 17 to 33 when the computer program is executed.

In a thirty-eighth clause, a non-transitory computer-readable storage medium. The non-transitory computer-readable storage medium stores a computer program, and the computer program, when executed on a first processor, causes the method according to any one of the first to the sixteenth clause to be implemented, or the computer program, when executed on a second processor, causes the method according to any one of the seventeenth to the thirty-third clause to be implemented.

Figure 7:
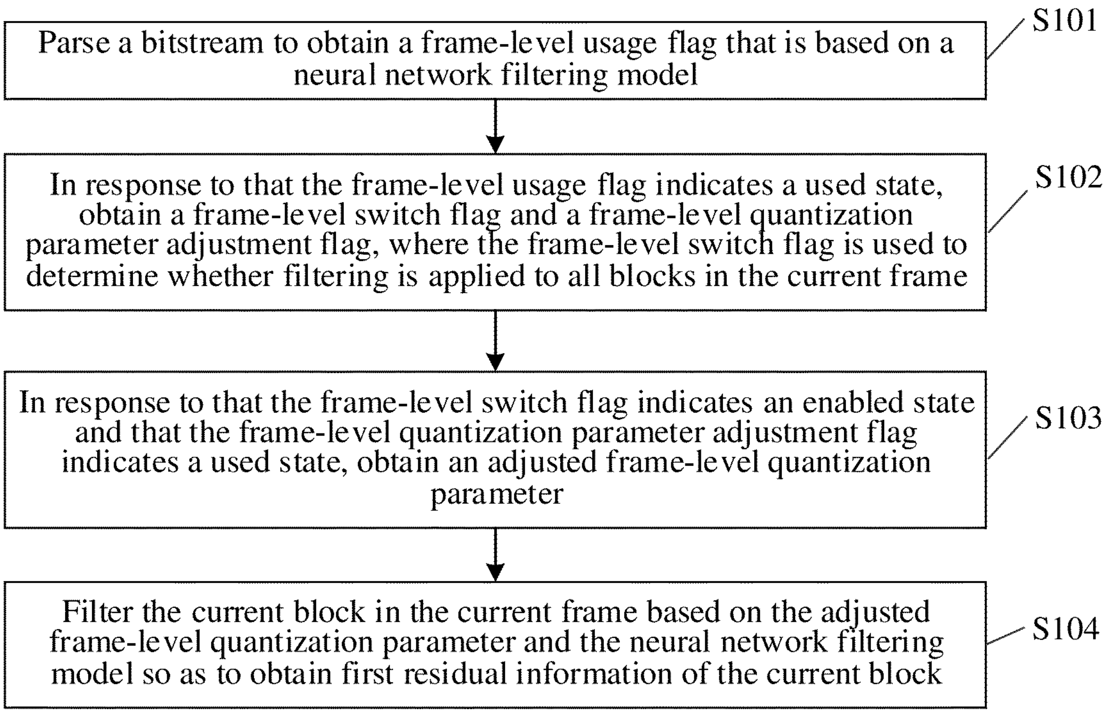
FIG. 7 is a schematic flowchart of a filtering method provided in the embodiments of the present application.

The embodiments of the present application provide a filtering method, which is applied to a decoder. As shown in FIG. 7, the method may include the following steps.

In S101, a bitstream is parsed to obtain a frame-level usage flag that is based on a neural network filtering model.

In the embodiments of the present application, at the decoder side, for the current block, the decoder employs intra prediction or inter prediction to generate a prediction block of the current block. The decoder also parses the bitstream to obtain a quantization coefficient matrix, and applies inverse quantization and inverse transform to the quantization coefficient matrix to obtain a residual block. The residual block is added to the prediction block to obtain a reconstructed block, and reconstructed blocks form a reconstructed picture. The decoder performs in-loop filtering on the reconstructed picture based on a picture or a block to obtain a decoded picture.

It should be noted that since the original picture can be partitioned into CTUs (coding tree units), or CTUs can be partitioned into CUs, thus, the filtering method in the embodiments of the present application may be applied not only to CU-level in-loop filtering (that is to say, the block partitioning information in this case is CU partitioning information), but also to CTU-level in-loop filtering (that is to say, the block partitioning information in this case is CTU partitioning information), which are not limited in the embodiments of the present application.

In the embodiments of the present application, a CTU is an example of a block for illustration.

In the embodiments of the present application, when the decoder performs in-loop filtering on a reconstructed picture of the current frame, the decoder may first obtain a sequence-level enabled flag (sps_nnlf_enable_flag) by parsing the bitstream. The sequence-level enabled flag is a switch for determining whether to enable a filtering function for the entire to-be-processed video sequence. In a case where the sequence-level enabled flag indicates an allowed state, the decoder parses syntax elements of the current frame and obtains the frame-level usage flag that is based on the neural network filtering model. The frame-level usage flag is used to indicate whether filtering is applied to the current frame. In a case where the frame-level usage flag indicates a used state, the frame-level usage flag indicates that some or all blocks in the current frame need to be filtered. In a case where the frame-level usage flag indicates an unused state, the frame-level usage flag indicates that all blocks in the current frame do not need to be filtered, and the decoder may continue to traverse other filtering methods to output a complete reconstructed picture.

It should be noted that, by default, the relevant syntax elements are set to an initial value or a negative state.

It should be noted that the frame-level usage flag based on the neural network filtering model is not limited to a specific form, and may be a letter, a symbol, etc., which is not limited in the embodiments of the present application.

Exemplarily, a value "1" of the frame-level usage flag based on the neural network filtering model may be used to indicate a used state, and a value "0" may be used to indicate an unused state. The specific form and meaning of the value of the frame-level usage flag are not limited in the embodiments of the present application.

In some embodiments of the present application, the frame-level usage flag for the current frame may be embodied as one or more flags. In the case of multiple flags, different colour components of the current frame may correspond to a respective frame-level usage flag, i.e., a frame-level usage flag for a colour component. The frame-level usage flag for a colour component indicates whether blocks in the current frame under the colour component need to be filtered.

It should be noted that the decoder traverses the frame-level usage flag of each colour component of the current frame to determine whether to apply filtering to the blocks under each colour component.

In S102, in response to that the frame-level usage flag indicates a used state, a frame-level control flag and a frame-level quantization parameter adjustment flag are obtained, where the frame-level control flag is used to determine whether filtering is applied to all blocks in the current frame;

In the embodiments of the present application, in a case where the decoder determines that the frame-level usage flag indicates a used state, the decoder may further obtain the frame-level control flag and the frame-level quantization parameter adjustment flag by parsing the bitstream. The frame-level control flag is used to determine whether filtering is applied to all blocks in the current frame.

All blocks mentioned here may be all coding tree units in the current frame.

The frame-level control flag may include a frame-level control flag corresponding to each colour component. The frame-level control flag may further indicates whether all coding tree units under the current colour component are filtered based on a neural network based in-loop filtering technology.

In the embodiments of the present application, if the frame-level control flag indicates an enabled state, it represents that all coding tree units under the current colour component are filtered based on the neural network based in-loop filtering technology, that is, the coding tree unit-level usage flags of all coding tree units in the current frame under the colour component is automatically set to indicate a used state. If the frame-level control flag indicates a disabled state, it represents that some coding tree units under the current colour component are filtered based on the neural network based in-loop filtering technology, and some coding tree units are not filtered based on the neural network based in-loop filtering technology. If the frame-level control flag indicates a disabled state, it is necessary to further obtain the coding tree unit-level usage flags of all coding tree units in the current frame under the colour component by parsing.

It should be noted that, in the embodiments of the present application, in a case where a coding tree unit is used as a block, the coding tree unit-level usage flag may be understood as the block-level usage flag.

Exemplarily, a value “1” of the frame-level control flag may be used to indicate an enabled stated, and a value “0” may be used to indicate a disabled state. The specific form and meaning of the value of the frame-level control flag are not limited in the embodiments of the present application.

In the embodiments of the present application, a frame-level quantization parameter adjustment flag indicates whether quantization parameter(s) (such as BaseQP and SliceQP) have been adjusted for the current frame. If the frame-level quantization parameter adjustment flag indicates a used state, it is indicated that quantization parameter(s) of the current frame have been adjusted, thus, it is necessary to further obtain a frame-level quantization parameter adjustment index by parsing for the subsequent filtering process. If the frame-level quantization parameter adjustment flag indicates an unused state, it is indicated that the quantization parameter(s) have not been adjusted, and thus, quantization parameter(s) obtained by parsing the bitstream may be used to complete the subsequent processing processes.

Exemplarily, a value “1” of the frame-level quantization parameter adjustment flag may be used to indicate a used state, and a value “0” may be used to indicate an unused state. The specific form and meaning of the value of the frame-level quantization parameter adjustment flag are not limited in the embodiments of the present application.

In some embodiments of the present application, the decoder may determine whether to adjust quantization parameter(s) of the current frame according to different types of encoded frames. For a first type of frame, quantization parameter(s) need to be adjusted, but for a second type of frame, quantization parameter(s) do not need to be adjusted. The second type of frame is a frame in a type other than the first type. Thus, during decoding, in a case where the current frame needs to be filtered, the decoder may obtain the frame-level quantization parameter adjustment flag by parsing the bitstream when the current frame is the first type of frame.

In some embodiments of the present application, after obtaining the frame-level usage flag that is based on the neural network filtering model and before obtaining an adjusted frame-level quantization parameter, the decoder obtains the frame-level control flag and the frame-level quantization parameter adjustment flag in response to that the frame-level usage flag indicates a used state and the current frame is the first type of frame.

It should be noted that, in the embodiments of the present application, the first type of frame may be a B-frame or a P-frame, which is not limited in the embodiments of the present application.

It should be noted that the decoder may obtain the frame-level control flag and the frame-level quantization parameter adjustment flag together by parsing.

In S103, in response to that the frame-level control flag indicates an enabled state and that the frame-level quantization parameter adjustment flag indicates a used state, an adjusted frame-level quantization parameter is obtained.

After obtaining the frame-level control flag and the frame-level quantization parameter adjustment flag by parsing, the decoder obtains the adjusted frame-level quantization parameter in response to that the frame-level control flag indicates an enabled state and that the frame-level quantization parameter adjustment flag indicates a used state.

It should be noted that in a case where the frame-level control flag indicates an enabled state, a case that, under the current colour component, some coding tree units need to be filtered is indicated. In this case, if the frame-level quantization parameter adjustment flag indicates a used state, it is necessary to obtain the adjusted frame-level quantization parameter so that the adjusted frame-level quantization parameter can be used in filtering at the coding tree unit level.

In the embodiments of the present application, if the frame-level quantization parameter adjustment flag indicates a used state, the decoder may obtain the frame-level quantization adjustment index from the bitstream, and determine an adjusted quantization parameter based on the frame-level quantization adjustment index.

In some embodiments of the present application, the decoder determines a frame-level quantization offset parameter based on the frame-level quantization parameter adjustment index obtained from the bitstream, and determines the adjusted frame-level quantization parameter based on the obtained frame-level quantization parameter and frame-level quantization offset parameter.

The magnitudes of adjustment for all the coding tree units in the current frame are the same, that is, the quantization parameter inputs of all the coding tree units are the same.

It should be noted that during encoding, if the encoder determines that quantization parameter(s) need to be adjusted, a sequence number corresponding to a frame-level quantization offset parameter is used as a frame-level quantization adjustment index and is encoded into the bitstream. The decoder stores a correspondence between sequence numbers and quantization offset parameters therein. In this way, the decoder can determine a frame-level quantization offset parameter based on a frame-level quantization adjustment index. The decoder can obtain an adjusted frame-level quantization parameter by adjusting the frame-level quantization parameter using the frame-level quantization offset parameter. The quantization parameter(s) may be obtained from the bitstream.

Exemplarily, if a frame-level quantization parameter index adjustment flag of the current frame indicates a used state, a quantization parameter is adjusted according to the frame-level quantization parameter adjustment index. For example, if the quantization parameter adjustment index points to offset1, BasseQPFinal is obtained by adding the offset parameter offset1 to BaseQP, and BasseQPFinal replaces BaseQP as the quantization parameter of all coding tree units in the current frame and is input into the network model.

In some embodiments of the present application, the decoder obtains the adjusted frame-level quantization parameter from the bitstream.

That is to say, the encoder can directly transmit the adjusted quantization parameter to the decoder through the bitstream for decoding of the decoder.

In S104, the current block in the current frame is filtered based on the adjusted frame-level quantization parameter and the neural network filtering model so as to obtain first residual information of the current block.

After the decoder obtains the adjusted frame-level quantization parameter, since the frame-level control flag indicates an enabled state, the decoder can filter all coding tree units in the current frame. For the filtering of a coding tree unit, it is necessary to traverse the filtering processing of each colour component before decoding the next coding tree unit.

In the embodiments of the present application, a neural network filtering model and an adjusted frame-level quantization parameter are used to filter the current block in the current frame to obtain first residual information of the current block. Here, the current block is the current coding tree unit.

In the embodiments of the present application, before filtering the current block in the current frame based on the adjusted frame-level quantization parameter and the neural network filtering model to obtain the first residual information of the current block, the decoder obtains a reconstructed value of the current block. The neural network filtering model is used to filter the reconstructed value of the current block and the adjusted frame-level quantization parameter to obtain the first residual information of the current block, so as to complete the filtering of the current block.

In some embodiments of the present application, before the decoder filters the current block in the current frame based on the adjusted frame-level quantization parameter and the neural network filtering model to obtain the first residual information of the current block, the deconder obtains at least one of a prediction value of the current block, block partitioning information of the current block or a deblocking filtering boundary strength of the current block.

In some embodiments of the present application, the decoder filters the reconstructed value of the current block, the adjusted frame-level quantization parameter, and the at least one of the prediction value of the current block, the block partitioning information of the current block or the deblocking filtering boundary strength of the current block by using the neural network filtering model, to obtain the first residual information of the current block, thereby completing the filtering of the current block.

It should be noted that, during the filtering process, the input parameters input into the neural network filtering model may include: the prediction value of the current block, the block partitioning information of the current block, the deblocking filtering boundary strength of the current block, the reconstructed value of the current block, and the adjusted frame-level quantization parameter (or the quantization parameter). The information type of the input parameters is not limited in the present application. However, the prediction value of the current block, the block partitioning information and the deblocking filtering boundary strength may not be required every time, which needs to be determined based on actual situations.

In some embodiments of the present application, after the decoder filters the current block in the current frame based on the adjusted frame-level quantization parameter and the neural network filtering model to obtain the first residual information of the current block, the decoder may further obtain a second residual scaling factor in the bitstream, scales the first residual information of the current block based on the second residual scaling factor to obtain first target residual information.

Further, the decoder determines a first target reconstructed value of the current block based on the first target residual information and the reconstructed value of the current block.

It should be noted that after the encoder obtains the residual information, the encoder may perform scaling processing on the first residual information by using the second residual scaling factor to obtain the first residual information. Therefore, the decoder needs to scale the first residual information of the current block based on the second residual scaling factor to obtain the first target residual information, and determine the first target reconstructed value of the current block based on the first target residual information and the reconstructed value of the current block. However, if the encoder does not use the residual factor during encoding, but needs to input a quantization parameter (or an adjusted quantization parameter) during filtering, the filtering method provided in the embodiments of the present application is also applicable, except that the residual information does not need to be scaled using the residual factor.

It should be noted that each colour component has corresponding residual information and a corresponding residual factor.

It can be understood that the decoder can determine, based on the frame-level quantization parameter adjustment flag, whether a quantization parameter input into the neural network filtering model needs to be adjusted, which implements flexible selection and diversity change handling of quantization parameters, thereby improving the decoding efficiency.

In some embodiments of the present application, during the filtering process in coding and decoding, a portion of the data in the input parameters of the neural network filtering model may be adjusted using the aforementioned principles before filtering processing.

In the embodiments of the present application, an adjustment processing may be applied to at least one of the quantization parameter, the prediction value of the current block, the block partitioning information of the current block or the deblocking filtering boundary strength of the current block in the input parameters, which is not limited in the embodiments of the present application.

In some embodiments of the present application, in response to that the frame-level usage flag indicates the used state, a frame-level control flag and a frame-level input parameter adjustment flag are obtained. The frame-level input parameter adjustment flag indicates whether any one of the parameters in the prediction value, the block partitioning information, and the deblocking filtering boundary strength is adjusted.

In response to that the frame-level control flag indicates an enabled state and that the frame-level input parameter adjustment flag indicates a used state, adjusted block-level input parameter(s) are obtained.

Based on the adjusted block-level input parameter(s), the obtained frame-level quantization parameter and the neural network filtering model, the current block in the current frame is filtered to obtain third residual information of the current block.

In response to that the frame-level control flag indicates an enabled state, it is necessary to obtain the block-level usage flag, and then determine whether to filter the current block. If it is determined that filtering is required, the decoder may perform filtering according to adjusted block-level input parameter(s).

It can be understood that the decoder can determine, based on the frame-level input parameter adjustment flag, whether input parameter(s) input into the neural network filtering model need to be adjusted, which implements flexible selection and diversity change handling of input parameters, thereby improving the decoding efficiency.

In some embodiments of the present application, a filtering method provided by the embodiments of the present application may further include the following steps.

In S101, a bitstream is parsed to obtain the frame-level usage flag that is based on a neural network filtering model.

In S102, in response to that the frame-level usage flag indicates the used state, the frame-level control flag and the frame-level quantization parameter adjustment flag are obtained; where the frame-level control flag is used to determine whether filtering is applied to all blocks in the current frame.

It should be noted that S101 and S102 have been described above and will not be repeated here.

The current block may be a coding tree unit, which is not limited in the embodiments of the present application.

In S105, in response to that the frame-level control flag indicates a disabled state, a block-level usage flag is obtained.

In S106, in response to that the block-level usage flag indicates that the neural network filtering is applied to any one colour component of the current block, and that the frame-level quantization parameter adjustment flag indicates the used state, an adjusted frame-level quantization parameter is obtained.

In the embodiments of the present application, in a case where the frame-level control flag indicates the disabled state, it is necessary to obtain the block-level usage flag from the bitstream.

It should be noted that the block-level usage flag of the current block includes a block-level usage flag corresponding to each colour component.

In the embodiments of the present application, in a case where the block-level usage flag indicates that the neural network filtering is applied to any one colour component of the current block, and the frame-level quantization parameter adjustment flag indicates a used state, the adjusted frame-level quantization parameter is obtained. The process of obtaining the adjusted frame-level quantization parameter may be consistent with the aforementioned implementation and will not be repeated here.

It should be noted that, for the current block, as long as a block-level usage flag corresponding to any one colour component indicates a used state, the decoded needs to perform filtering processing to the current block to obtain residual information corresponding to each colour component. Therefore, for the current block, as long as the block-level usage flag corresponding to any one colour component indicates the used state, it is necessary to obtain the adjusted frame-level quantization parameter for use in filtering.

In S107, the current block in the current frame is filtered based on the adjusted frame-level quantization parameter and the neural network filtering model to obtain first residual information of the current block.

In the embodiments of the present application, the decoder filters the current block in the current frame based on the adjusted frame-level quantization parameter and the neural network filtering model to obtain the first residual information of the current block.

The first residual information includes residual information corresponding to each colour component. The decoder determines the reconstructed value of each colour component of the current block according to the block-level usage flag corresponding to each colour component. If the block-level usage flag corresponding to the colour component indicates the used state, a target reconstructed value corresponding to the colour component is a sum of the reconstructed value of the colour component of the current block and the residual information output during the filtering under the colour component. If the block-level usage flag corresponding to the colour component indicates the unused state, the target reconstructed value corresponding to the colour component is the reconstructed value of the colour component of the current block.

Exemplarily, if the coding tree unit-level usage flags of all colour components of the current coding tree unit do not all indicate the unused state, the current coding tree unit is filtered based on a neural network based in-loop filtering technology, and reconstructed samples YUV of the current coding tree unit, prediction samples YUV of the current coding tree unit, partitioning information YUV of the current coding tree unit, and quantization parameter information of the current coding tree unit are used as inputs to obtain the residual information of the current coding tree unit. The quantization parameter information is adjusted according to the frame-level quantization parameter adjustment flag and the frame-level quantization parameter adjustment index. The residual information is scaled, and the residual scaling factor has been obtained from in the above parsing of the bitstream. The scaled residual is added to the reconstructed samples to obtain the reconstructed samples YUV after the neural network based in-loop filtering. According to the coding tree unit usage flag of each colour component of the current coding tree unit, reconstructed samples are selected as the outputs of the neural network based in-loop filtering technology If the corresponding coding tree unit usage flag of a colour component indicates the used state, the reconstructed samples of the corresponding colour component after the neural network based in-loop filtering are used as the outputs; otherwise, the reconstructed samples obtained without the neural network based in-loop filtering are used as the outputs of the colour component. After all the coding tree units in the current frame are traversed, the neural network based in-loop filtering module ends.

It can be understood that the decoder can determine, based on the frame-level quantization parameter adjustment flag, whether quantization parameter(s) input into the neural network filtering model need to be adjusted, which implements flexible selection and diversity change handling of quantization parameters, thereby improving the decoding efficiency.

In some embodiments of the present application, after the decoder obtains the block-level usage flag, the decoder obtains the block-level quantization parameter adjustment flag.

In a case where the block-level usage flag indicates that the neural network filtering is applied to any one colour component of the current block, and the block-level quantization parameter adjustment flag indicates the used state, an adjusted block-level quantization parameter is obtained, and the current block in the current frame is filtered based on the adjusted block-level quantization parameter and the neural network filtering model to obtain second residual information of the current block.

In some embodiments of the present application, the decoder determines a block-level quantization offset parameter based on a block-level quantization parameter index obtained from the bitstream, and determines the adjusted block-level quantization parameter according to an obtained block-level quantization parameter and the block-level quantization offset parameter.

It should be noted that the decoder obtaining the adjusted block-level quantization parameter may includes: parsing the bitstream to obtain the block-level quantization offset parameter corresponding to the block-level quantization parameter index; based on the quantization parameter, performing addition operation according to the block-level quantization offset parameters corresponding to different blocks to obtain the block-level quantization parameter corresponding to the current block. Then, based on the adjusted block-level quantization parameter and the neural network filtering model, the current block in the current frame is filtered to obtain the second residual information of the current block.

In the embodiments of the present application, the adjustments for different coding tree units may be different, that is, the quantization parameter inputs of different coding tree units may be different.

In some embodiments of the present application, after the decoder obtains the block-level usage flag, in response to that the block-level usage flag indicates that the neural network filtering is applied to any one colour component of the current block, the decoder obtains the block-level quantization parameter corresponding to the current block. Based on the adjusted block-level quantization parameter and the neural network filtering model, the decoder filters the current block in the current frame to obtain the second residual information of the current block.

It should be noted that, for each flag in the present application, a value "1" may be used to indicate a used state or an allowed state, and a value "0" may be used to indicate an unused state or a disallowed state, which is not limited in the embodiments of the present application.

It should be noted that the block-level quantization parameter corresponding to the current block may be obtained by parsing the bitstream.

In some embodiments of the present application, after filtering the current block in the current frame based on the adjusted block-level quantization parameter and the neural network filtering model to obtain the second residual information of the current block, the decoder obtains a second residual scaling factor from the bitstream; based on the second residual scaling factor, the decoder scales the second residual information of the current block to obtain second target residual information; and in response to that the block-level usage flag indicates the used state, the decoder determines a second target reconstructed value of the current block based on the second target residual information and the reconstructed value of the current block. If the block-level usage flag indicates the unused state, the reconstructed value of the current block is determined as the second target reconstructed value.

It should be noted that the decoder side continues to traverse other in-loop filtering methods and outputs a complete reconstructed picture after traversing the other in-loop filtering methods.

It can be understood that the decoder can determine, based on the frame-level quantization parameter adjustment flag, whether block-level quantization parameter(s) input into the neural network filtering model need to be adjusted. In this way, the flexible selection and diversity change handling of the block-level quantization parameters are achieved, and magnitudes of adjustment for different blocks may be different, which improvs the decoding efficiency.

Figure 8:
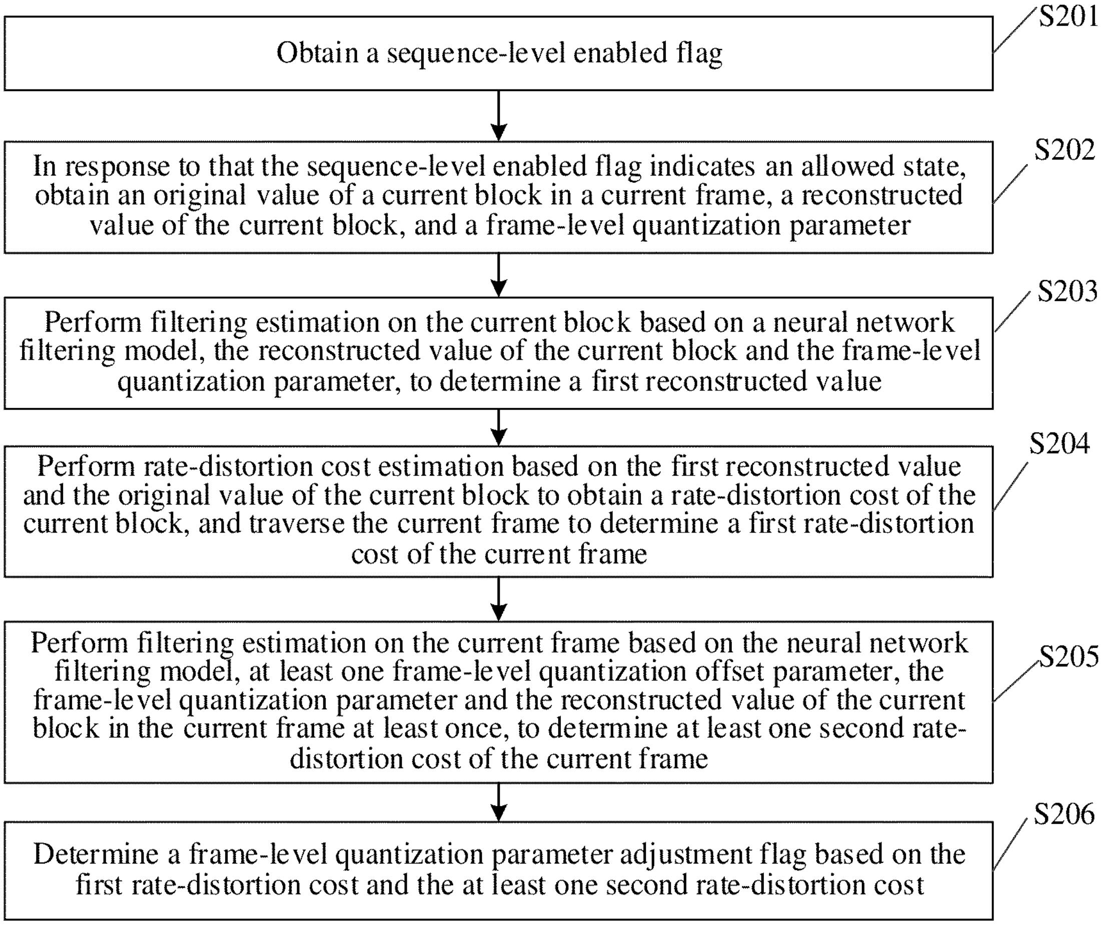
FIG. 8 is a block diagram of another filtering method provided in the embodiments of the present application.

The embodiments of the present application provide a filtering method, which is applied to an encoder. As shown in FIG. 8, the method may include the following steps.

In S201, a sequence-level enabled flag is obtained.

In S202, in response to that the sequence-level enabled flag indicates an allowed state, an original value of a current block in a current frame, a reconstructed value of the current block, and a frame-level quantization parameter are obtained.

In S203, filtering estimation is performed on the current block based on a neural network filtering model, the reconstructed value of the current block and the frame-level quantization parameter, to determine a first reconstructed value.

In the embodiments of the present application, the encoder traverses all coding units based on intra prediction or inter prediction to obtain a prediction block of each coding unit. A residual of each coding unit may be obtained by subtracting the prediction block from the original picture block, and a frequency domain residual coefficient is obtained by performing various transforms on the residual. Distorted residual information is obtained by performing quantization, inverse quantization, and inverse transform on the frequency domain residual coefficient. A reconstructed block may be obtained by adding the distorted residual information to the prediction block. After the picture is encoded, a in-loop filtering module filters the picture with per coding tree unit as a basic unit. In the embodiments of the present application, a block is described as a coding tree unit, but the block is not limited to CTU, but may also be CU, which is not limited in the embodiments of the present application. The encoder obtains the sequence-level enabled flag based on the neural network filtering model, i.e., sps_nnlf_enable_flag, and if the sequence-level enabled flag indicates the allowed state, the neural network based in-loop filtering technology is allowed to be used; or if the sequence-level enabled flag indicates a disallowed state, the neural network based in-loop filtering technology is not allowed to be used. The sequence-level enabled flag needs to be encoded into a bitstream during the coding of a video sequence.

In the embodiments of the present application, if the sequence-level enabled flag indicates the allowed state, the encoder side attempts to obtain the original value of the current block in the current frame, the reconstructed value of the current block, and the frame-level quantization parameter through the neural network filtering model based in-loop filtering technology. If the sequence-level enabled flag based on the neural network filtering model indicates the disallowed state, instead of the neural network based in-loop filtering technology, the encoder side try to use other in-loop filtering tools for filtering, such as LF filtering, and will output a complete reconstructed picture after filtering.

In the embodiments of the present application, for the current frame, filtering estimation is performed on the current block based on the neural network filtering model, the reconstructed value of the current block and the frame-level quantization parameter to determine first estimated residual information. A first residual scaling factor is determined. The first estimated residual value is scaled by using the first residual scaling factor so as to obtain first scaled residual information. The first scaled residual information is added to the reconstructed value of the current block to determine the first reconstructed value.

In the embodiments of the present application, before determining the first residual scaling factor, for the current frame, the encoder obtains a reconstructed value of the current block and at least one of a prediction value of the current block, block partitioning information of the current block or a deblocking filtering boundary strength of the current block. The encoder performs filtering estimation on the reconstructed value of the current block, the frame-level quantization parameter, and the at least one of the prediction value of the current block, the block partitioning information of the current block or the deblocking filtering boundary strength of the current block by using the neural network filtering model, to obtain the first estimated residual information of the current block.

It should be noted that the input parameters input into the neural network filtering model may be determined according to actual situations, which is not limited in the embodiments of the present application.

In S204, rate-distortion cost estimation is performed based on the first reconstructed value and the original value of the current block to obtain a rate-distortion cost of the current block, and the current frame is traversed to determine a first rate-distortion cost of the current frame.

In the embodiments of the present application, after obtaining the first reconstructed value of the current block, the encoder performs rate-distortion cost estimation based on the first reconstructed value and the original value of the current block to obtain the rate-distortion cost, and proceeds with the coding processing of the next block until obtaining rate-distortion costs of all blocks in the current frame. The first rate-distortion cost of the current frame is obtained by adding up the rate-distortion costs of all blocks.

Exemplarily, the encoder attempts to perform filtering based on the neural network based in-loop filtering technology, and reconstructed samples YUV, prediction samples YUV, YUV with partition information, and quantization parameters (such as BaseQP and SliceQP) of the current coding tree unit are input into the neural network filtering model for inference. The neural network filtering model outputs filtered estimated residual information of the current coding tree unit, and scales the estimated residual information. The scaling factor used in the scaling operation is calculated based on the original picture samples of the current frame, reconstructed samples not processed with the neural network in-loop filtering, and the reconstructed samples processed with the neural network in-loop filtering. The scaling factors corresponding to different colour components are different, and need to be encoded into the bitstream when necessary and transmitted to the decoder side. The encoder adds the scaled residual information to the reconstructed samples not processed with the neural network in-loop filtering, and then outputs the sum. The encoder calculates a rate-distortion cost value based on the coding tree unit samples processed with the neural network in-loop filtering and the original picture samples of the coding tree unit, which is denoted as a first rate-distortion cost costNN of the current frame.

In S205, based on the neural network filtering model, at least one frame-level quantization offset parameter, the frame-level quantization parameter, and the reconstructed value of the current block in the current frame, filtering estimation is performed on the current frame at least once to determine at least one second rate-distortion cost of the current frame.

The encoder performs filter estimation at least once, during which the encoder attempts to change input parameter(s) input into the neural network filtering model at least once, to obtain the at least one second rate-distortion cost (costOffset) of the current frame.

It should be noted that input parameter(s) may be the reconstructed value of the current block, the frame-level quantization parameter and at least one of the prediction value of the current block, the block partitioning information of the current block or the deblocking filtering boundary strength of the current block, and may further include other information, which is not limited in the embodiments of the present application. In order to perform filtering estimation, the encoder may adjust any one of the frame-level quantization parameter, the prediction value of the current block, the block partitioning information of the current block, and the deblocking filtering boundary strength of the current block, which is not limited in the embodiments of the present application.

In some embodiments of the present application, if the sequence-level enabled flag indicates the allowed state, the reconstructed value of the current block, the frame-level quantization parameter, and at least one of the prediction value of the current block, the at least one of block partitioning information of the current block or a deblocking filtering boundary strength of the current block are obtained.

Filtering estimation is performed on the current block based on the neural network filtering model, the reconstructed value of the current block, the frame-level quantization parameter, and the at least one of the prediction value of the current block, the block partitioning information of the current block or the deblocking filtering boundary strength of the current block, to determine a sixth reconstructed value.

Rate-distortion cost estimation is performed based on the sixth reconstructed value and the original value of the current block to obtain the rate-distortion cost of the current block, and the current frame is traversed to determine a seventh rate-distortion cost of the current frame.

Filtering estimation is performed on the current frame at least once based on the neural network filtering model, at least one frame-level input offset parameter, the reconstructed value of the current block in the current frame, and the at least one of the prediction value of the current block, the block partitioning information of the current block or the deblocking filtering boundary strength of the current block, to determine at least one eighth rate-distortion cost of the current frame.

Based on the first rate-distortion cost and the at least one eighth rate-distortion cost, a frame-level input parameter adjustment flag is determined.

In a case where an input parameter is a frame-level quantization parameter, the frame-level input parameter adjustment flag may be understood as a frame-level quantization parameter adjustment flag.

It can be understood that the encoder may determine, based on the frame-level input parameter adjustment flag, whether the input parameters input into the neural network filtering model need to be adjusted, which implements flexible selection and diversity change handling of input parameters, thereby improving the coding efficiency.

Exemplarily, the adjustment of the frame-level quantization parameter is implemented as follows:

the encoder obtains the i-th frame-level quantization offset parameter, adjusts the frame-level quantization parameter based on the i-th frame-level quantization offset parameter to obtain the i-th adjusted frame-level quantization parameter, where i is a positive integer greater than or equal to 1; based on the neural network filtering model, the reconstructed value of the current block and the i-th adjusted frame-level quantization parameter, the encoder performs filtering estimation on the current block so as to obtain the i-th second reconstructed value; and the encoder performs rate-distortion cost estimation based on the i-th second reconstructed value and the original value of the current block, traverses all blocks in the current frame to obtain the i-th second rate-distortion cost, and proceeds with the (i+1)-th filtering estimation based on the (i+1)-th frame-level quantization offset parameter until completing rate-distortion cost estimation at least once, so as to determine the at least one second rate-distortion cost of the current frame.

In the embodiments of the present application, the encoder performs rate-distortion cost estimation based on the i-th second reconstructed value and the original value of the current block, and after traversing all blocks in the current frame, adds up the rate-distortion costs of all blocks to obtain the i-th second rate-distortion cost. The encoder proceeds with the (i+1)-th filtering estimation based on the (i+1)-th frame-level quantization offset parameter until the filtering estimation of all blocks is completed, and thus, another rate-distortion cost of the current frame is obtained. After at least one round of filtering is completed, at least one second rate-distortion cost of the current frame is obtained.

In the embodiments of the present application, an implementation of obtaining the i-th second reconstructed value by the encoder through performing filtering estimation on the current block based on the neural network filtering model, the reconstructed value of the current block and the i-th adjusted frame-level quantization parameter includes: performing filtering estimation on the current block based on the neural network filtering model, the reconstructed value of the current block and the i-th adjusted frame-level quantization parameter once, to obtain the i-th piece of second estimated residual information; determining the i-th second residual scaling factor corresponding to the i-th adjusted frame-level quantization parameter; scaling the i-th second estimated residual information by using the i-th second residual scaling factor to obtain the i-th piece of second scaled residual information; and adding up the i-th piece of second scaled residual information and the reconstructed value of the current block to determine the i-th second reconstructed value.

In some embodiments of the present application, the encoder may further obtains the reconstructed value of the current block and at least one of the prediction value of the current block, the block partitioning information of the current block or the deblocking filtering boundary strength of the current block, and performs frame-level filtering estimation on the reconstructed value of the current block, the i-th adjusted frame-level quantization parameter, and the at least one of the prediction value of the current block, the block partitioning information of the current block or the deblocking filtering boundary strength of the current block by using the neural network filtering model, to obtain the i-th piece of second estimated residual information of the current block.

In some embodiments of the present application, the encoder may determine whether to adjust quantization parameter(s) of the current frame according to different types of encoded frames. For a first type of frame, quantization parameter(s) need to be adjusted, but for a second type of frame, quantization parameter(s) do not need to be adjusted. The second type of frame is a frame in a type other than the first type. Thus, during coding, in a case where the current frame is the first type of frame, the encoder adjusts the frame-level quantization parameter so as to use it for filtering estimation.

In some embodiments of the present application, in a case where the current frame is the first type of frame, based on the current frame based on the neural network filtering model, the at least one frame-level quantization offset parameter, the frame-level quantization parameter, and the reconstructed value of the current block in the current frame, filtering estimation is performed on the current frame at least once to determine the at least one second rate-distortion cost of the current frame.

It should be noted that, in the embodiments of the present application, the first type of frame may be a B-frame or a P-frame, which is not limited in the embodiments of the present application.

Exemplarily, the encoder may adjust BaseQP and SliceQP used as inputs, so that the encoder side has more options to attempt, thereby improving the coding efficiency.

The above adjustment of BaseQP and SliceQP includes a unified adjustment for all coding tree units in a frame, or independent adjustment for each coding tree unit. In a case of the unified adjustment for all coding tree units in a frame, no matter the current frame is an I-frame or a B-frame, an adjustment is performed for the current frame, and the adjustment amplitudes for all coding tree units in the current frame are the same, that is, the quantization parameter inputs of all coding tree units are the same. In a case of independent adjustment for each coding tree unit, no matter the current frame is an I-frame or a B-frame, an adjustment is performed for the current frame, the adjustment amplitudes for all coding tree units in the current frame may be selected based on the principle of rate-distortion optimization of the current coding tree unit at the encoder side, and the adjustments for different coding tree units may be different, that is, the quantization parameter inputs of different coding tree units may be different.

It can be understood that the encoder may determine, based on the block-level quantization parameter adjustment flag, whether the input parameters input into the neural network filtering model need to be adjusted, which implements flexible selection and diversity change handling of block-level quantization parameters, thereby improving the coding efficiency.

In S206, based on the first rate-distortion cost and the at least one second rate-distortion cost, a frame-level quantization parameter adjustment flag is determined.

In the embodiments of the present application, the encoder may determine, based on the first rate-distortion cost and the at least one second rate-distortion cost, the frame-level quantization parameter adjustment flag that is, determine whether the frame-level quantization parameter needs to be adjusted during filtering.

Exemplarily, the above adjustments of BaseQP and SliceQP may be controlled through frame-level flag(s), and the frame-level flag(s) includes at least one frame-level flag. For example, different frame-level quantization parameter adjustment flags may be set for different colour components, which may includes one frame-level quantization parameter adjustment flag set for the brightness component, and one frame-level quantization parameter adjustment flag set for one chrominance component. An extension of the frame-level quantization parameter adjustment flag may be that one or more flags are used to indicate whether the quantization parameter is adjusted for all coding tree units in the current frame, or whether adjustments made quantization parameter are the same for all coding tree units, which is not limited in the embodiments of the present application.

In some embodiments of the present application, an implementation of determining the frame-level quantization parameter adjustment flag by the encoder based on the first rate-distortion cost and the at least one second rate-distortion cost includes: determining a first minimum rate-distortion cost (bestCostNN) from the first rate-distortion cost and the at least one second rate-distortion cost; if the first minimum rate-distortion cost is the first rate-distortion cost, determining that the frame-level quantization parameter adjustment flag indicates an unused state; or if the first minimum rate-distortion cost is any one of the at least one second rate-distortion cost, determining that the frame-level quantization parameter adjustment flag indicates a used state.

In some embodiments of the present application, after determining the frame-level quantization parameter adjustment flag based on the first rate-distortion cost and the at least one second rate-distortion cost, if the first minimum rate-distortion cost is any one of the at least one second rate-distortion cost, the encoder encodes one frame-level quantization offset parameter, from the least one frame-level quantization offset parameter, that is corresponding to the first minimum rate-distortion cost into a bitstream, or encodes a block-level quantization parameter index (i.e., offse number) of the frame-level quantization offset parameter corresponding to the first minimum rate-distortion cost into the bitstream.

In some embodiments of the present application, if the first minimum rate-distortion cost is any one of the at least one second rate-distortion cost, a second residual scaling factor corresponding to the first minimum rate-distortion cost is encoded into the bitstream. Alternatively, if the first minimum rate-distortion cost is the first rate-distortion cost, the first residual scaling factor is encoded into the bitstream.

It should be noted that the "encoded" here means "to be encoded", because before the encoding operation, the first minimum rate-distortion cost needs to be compared to costOrg and costCTU first and the first minimum rate-distortion cost should be the smallest one.

Exemplarily, the encoder side attempts to performs filtering based on the neural network based in-loop filtering technology, and the process is the same as that in the second round, except that adjustments are made to the input portion and this round of attempts may be repeated multiple times. For example, in the first attempt, BaseQP quantization parameter may be adjusted, offset parameter offset1 is added to BaseQP to adjust BaseQP, obtained BaseQPFinal replaces BaseQP as input, and keep the rest unchanged. Similarly, the rate-distortion cost value in the case of offset1 is calculated, which is denoted as costOffset1. The second offset parameter offset2 is also used for calculation of rate-distortion cost value, the process is the same as above, and the calculated rate-distortion cost value is denoted as costOffset2. In this example, two attempts are based on BaseQP offset in this round, and no adjustment attempt is made on SliceQP. After obtaining costNN, costOffset1 and costOffset2, the encoder compares the three values. If costNN is the smallest, the frame-level quantization parameter adjustment flag is set to indicate the unused state and is to be encoded into the bitstream. If costOffset1 is the smallest, the frame-level quantization parameter adjustment flag is set to indicate the used state, and the frame-level quantization parameter is set to the number representing the current offset1 and is to be encoded into the bitstream. In addition, the residual scaling factor corresponding to the to be encoded bitstream is replaced with the residual scaling factor under the current offset1.

It can be understood that the encoder can determine, based on the frame-level quantization parameter adjustment flag, whether the quantization parameter input into the neural network filtering model need to be adjusted, which implements flexible selection and diversity change handling of quantization parameters, thereby improving the coding efficiency.

In some embodiments of the present application, a filtering method provided for the encoder may further include the following steps.

In S207. in response to that the sequence-level enabled flag indicates the allowed state, rate-distortion cost estimation is performed based on the original value and the reconstructed value of the current block in the current frame to obtain a third rate-distortion cost.

If the sequence-level enabled flag indicates the allowed state, instead of performing filtering processing, the encoder performs rate-distortion cost estimation based on the original value and the reconstructed value of the current block in the current frame to obtain a third rate-distortion cost (costOrg).

In some embodiments of the present application, after the encoder determines the frame-level quantization parameter adjustment flag based on the first rate-distortion cost and the at least one second rate-distortion cost, the method further includes the following steps.

In S208, filtering estimation is performed on the current block based on the neural network filtering model, the reconstructed value of the current block and the frame-level quantization parameter to determine a third reconstructed value.

It should be noted that the implementation principle of S208 is the same as that of S203 and will not be repeated here.

In S209, rate-distortion cost estimation is performed based on the third reconstructed value and the original value of the current block to obtain a fourth rate-distortion cost (costCTUorg) of the current block.

It should be noted that the implementation principle of S209 is the same as that of S204, and will not be repeated here.

In S210, filtering estimation is performed on the current block based on the neural network filtering model, a target reconstructed value corresponding to the first minimum rate-distortion cost, and the frame-level quantization parameter, to obtain a fourth reconstructed value.

It should be noted that the implementation principle of S210 is the same as that of S203, except that the input in S210 is the target reconstructed value corresponding to the first minimum rate-distortion cost, rather than the reconstructed value of the current block.

In S211, rate-distortion cost estimation is performed based on the fourth reconstructed value and the original value of the current block to obtain a fifth rate-distortion cost (costCTUnn) of the current block.

It should be noted that the implementation principle of S211 is the same as that of S204 and will not be repeated here.

In S212, a block-level usage flag is determined based on the fourth rate-distortion cost and the fifth rate-distortion cost.

In the embodiments of the present application, if the fourth rate-distortion cost is less than the fifth rate-distortion cost, the block-level usage flag is determined to indicate the unused state; if the fourth rate-distortion cost is greater than or equal to the fifth rate-distortion cost, the block-level usage flag is determined to indicate the used state.

It should be noted that the block-level useage flag indicates whether the current block or coding tree unit needs to be filtered.

Exemplarily, a value "1" of the block-level usage flag may be used to indicate the used state, and a value "0" may be used to indicate the unused state. The specific form and meaning of the value of the block-level usage flag are not limited in the embodiments of the present application.

In S213, all blocks in the current frame are traversed to calculate a minimum rate-distortion cost of each of the block, and the sum of minimum rate-distortion costs of all the blocks in the current frame is determined as a sixth rate-distortion cost (costCTU) of the current frame.

In the embodiments of the present application, the encoder adds up the minimum rate-distortion costs of all blocks in the current frame under the corresponding colour component to obtain the frame-level rate-distortion cost of each colour component, and then adds up the rate-distortion cost of each colour component to obtain the sixth rate-distortion cost of the current frame.

Exemplarily, the encoder side attempts to carry out an optimized selection at the coding tree unit level and also attempts to apply a switch combination at the coding tree unit level, and each component may be controlled independently. The encoder traverses the current coding tree unit, to calculate a rate-distortion cost value between reconstructed samples and original samples of the current coding tree unit in a case where the neural network in-loop filtering is not used, which is denoted as costCTUorg, and to calculate a rate-distortion cost between the reconstructed samples and original samples of the current coding tree unit in a case where the neural network in-loop filtering is used, which is denoted as costCTUnn. If costCTUorg is less than costCTUnn, a neural network in-loop filtering based block usage flag at coding tree unit level is set to indicate the unused state, and is to be encoded into the bitstream; otherwise, the neural network in-loop filtering based block usage flag at coding tree unit level is set to indicate a used state, and is to be encoded into the bitstream. If all coding tree units in the current frame have been traversed, a rate-distortion cost value between the reconstructed samples of the current frame and the original picture samples in this case is calculated, which is denoted as costCTU.

In some embodiments of the present application, after the encoder performs rate-distortion cost estimation based on the third reconstructed value and the original value of the current block to obtain the fourth rate-distortion cost of the current block, and before the encoder determines the block-level usage flag based on the fourth rate-distortion cost and the fifth rate-distortion cost, the encoder performs filtering estimation on the current block based on the neural network filtering model, the reconstructed value of the current block, the at least one frame-level quantization offset parameter and the frame-level quantization parameter at least once, to determine at least one fifth reconstructed value, and further determines the minimum fifth rate-distortion cost based on the at least one fifth reconstructed value and the original value of the current block (the principle here is similar to the principle in the third round).

It should be noted that the process of performing filtering estimation on the current block based on the neural network filtering model, the reconstructed value of the current block, the at least one frame-level quantization offset parameter and the frame-level quantization parameter at least once to determine at least one fifth reconstructed value is similar to the process in S205 and will not be repeated here.

In some embodiments of the present application, after the encoder has obtained the third rate-distortion cost (costOrg), the first minimum rate-distortion cost (bestCostNN) and the sixth rate-distortion cost (costCTU), if the minimum rate-distortion cost among the third rate-distortion cost, the first minimum rate-distortion cost and the sixth rate-distortion cost is the third rate-distortion cost, it is determined that the frame-level usage flag indicates the unused state, and the frame-level usage flag is encoded into a bitstream.

If the minimum rate-distortion cost among the third rate-distortion cost, the first minimum rate-distortion cost and the sixth rate-distortion cost is the first minimum rate-distortion cost, it is determined that the frame-level usage flag indicates the used state and that the frame-level control flag indicates the enabled state, and the frame-level usage flag and the frame-level control flag are both encoded into the bitstream. Further, the frame-level quantization offset parameter corresponding to the first minimum rate-distortion cost is encoded into the bitstream, or the block-level quantization parameter index (offset number) of the frame-level quantization offset parameter corresponding to the first minimum rate-distortion cost is encoded into the bitstream.

If the minimum rate-distortion cost among the third rate-distortion cost, the first minimum rate-distortion cost and the sixth rate-distortion cost is the sixth rate-distortion cost, it is determined that the frame-level usage flag indicates the used state and that the frame-level control flag indicates the disabled state, and the frame-level usage flag, the frame-level control flag and the block-level usage flag are encoded into the bitstream.

Exemplarily, each colour component is traversed to calculate corresponding rate-distortion costs. If the value of costOrg is the smallest, the neural network in-loop filtering based frame-level usage flag corresponding to the colour component is set to indicate the unused state and encoded into the bitstream, and the neural network loop filtering is not performed. If the value of bestCostNN is the smallest, the neural network in-loop filtering based frame-level usage flag corresponding to the colour component is set to indicate the used state, the frame-level control flag is set to indicate the used state, and the frame-level quantization parameter adjustment flag, the index information and the residual scaling factor that are decided in the third round are encoded into the bitstream. If the value of costCTU is the smallest, the neural network in-loop filtering based frame-level usage flag corresponding to the colour component is set to indicate the used state, the frame-level control flag is set to indicate the unused state, and the frame-level quantization parameter adjustment flag, frame-level quantization parameter adjustment index and residual scaling factor that are decided in the third round are encoded into the bitstream. In addition, the block usage flag at each coding tree unit level needs to be encoded into the bitstream.

It can be understood that the encoder can determine, based on the frame-level quantization parameter adjustment flag, whether a quantization parameter input into the neural network filtering model needs to be adjusted, which implements flexible selection and diversity change handling of quantization parameters, thereby improving the coding efficiency.

Exemplarily, the in-loop filtering portion at the encoder side integrates the embodiments of the present application into the reference software of JVET EE1. The reference software uses VTM10.0 as the platform basis, and the basic performance is the same as VVC. The test results under common test conditions of RA (Table 1) and LDB (Table 2) are shown in the table below.

TABLE 1

| | Random Access BD-rate Over EE1-1.1 | | | | | | | |
|---|---|---|---|---|---|---|---|---|
| | Y-PSNR | U-PSNR | V-PSNR | Y-MSIM | U-MSIM | V-MSIM | EncT | DecT CPU |
| Class A1 | −0.23% | 0.09% | −0.52% | −0.04% | 0.37% | −0.68% | 142% | 87% |
| Class A2 | −0.24% | −0.25% | 0.15% | −0.12% | −0.27% | 0.68% | 137% | 80% |
| Class B | −0.23% | −0.31% | −0.11% | −0.19% | −0.72% | 0.03% | 139% | 85% |
| Class C | −0.30% | −0.42% | −0.50% | −0.27% | −0.50% | −0.78% | 130% | 99% |
| Class E | | | | | | | | |
| Overall | −0.25% | −0.25% | −0.24% | −0.17% | −0.35% | −0.20% | 137% | 88% |
| Class D | −0.25% | −0.41% | −0.21% | −0.21% | −0.78% | −0.32% | 129% | 96% |
| Class F | −0.13% | −0.08% | −0.09% | −0.10% | −0.04% | 0.16% | 163% | 99% |

TABLE 2

| | Low Delay B BD-rate Over EE1-1.1 | | | | | | | |
|---|---|---|---|---|---|---|---|---|
| | Y-PSNR | U-PSNR | V-PSNR | Y-MSIM | U-MSIM | V-MSIM | EncT | DecT CPU |
| Class A1 | | | | | | | | |
| Class A2 | | | | | | | | |
| Class B | | | | | | | | |
| Class C | −0.48% | −0.67% | −0.04% | −0.83% | −0.95% | 0.03% | 122% | 87% |
| Class E | −0.30% | 0.20% | −0.23% | −0.22% | 0.04% | −0.60% | 165% | 90% |
| Overall | | | | | | | | |
| Class D | −0.57% | −0.75% | −1.09% | −0.66% | −0.51% | −2.56% | 127% | 98% |
| Class F | −0.18% | −0.14% | −0.30% | −0.23% | −0.41% | −0.92% | 138% | 82% |

It can be seen from Table 1 and Table 2 in the above that the filtering method provided in the present application can achieve stable performance improvement regardless of the RA or LDB test conditions. It can be seen from classA1 to classE that RA has an average performance gain of more than 0.2% BD-rate. LDB has a better performance under some classes, with the highest BD-rate performance gain of 0.57%, which mainly depends on Y component. The filtering method provided in the present application does not bring additional complexity to the decoder side and does not increase additional complexity. At the decoder side, the quantization parameter only needs to be adjusted once when decoding the current frame, which does not increase the complexity while bringing stable gain.

Figure 9:
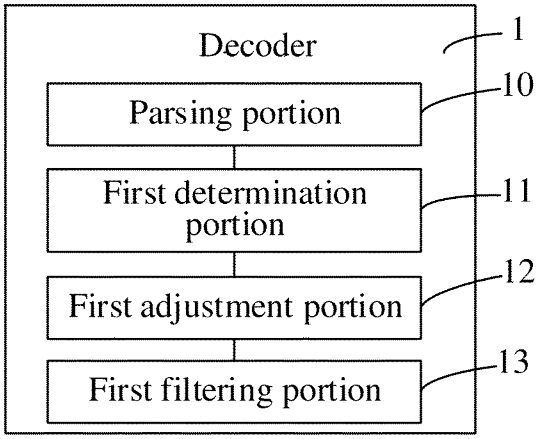
FIG. 9 is a schematic structural diagram of a decoder provided in the embodiments of the present application.

The embodiments of the present application provide a decoder 1, as shown in FIG. 9, the decoder 1 may include:

a parsing portion 10, configured to parse a bitstream to obtain a frame-level usage flag that is based on a neural network filtering model;

a first determination portion 11, configured to obtain a frame-level control flag and a frame-level quantization parameter adjustment flag in response to that the frame-level usage flag indicates a used state; wherein the frame-level control flag is used to determine whether filtering is applied to all blocks in a current frame;

a first adjustment portion 12, configured to configured to obtain an adjusted frame-level quantization parameter in response to that the frame-level control flag indicates an enabled state and that the frame-level quantization parameter adjustment flag indicates a used state; and a first filtering portion 13, configured to filter a current block in the current frame based on the adjusted frame-level quantization parameter and the neural network filtering model to obtain first residual information of the current block.

In some embodiments of the present application, the parsing portion 10 is further configured to obtain a block-level usage flag in response to that the frame-level control flag indicates a disabled state;

the first determination portion 11 is further configured to obtain an adjusted frame-level quantization parameter in response to that the block-level usage flag indicates that the neural network filtering is applied to any one colour component of the current block, and that the frame-level quantization parameter adjustment flag indicates the used state; and the first filtering portion 13 is further configured to filter the current block in the current frame based on the adjusted frame-level quantization parameter and the neural network filtering model to obtain first residual information of the current block.

In some embodiments of the present application, the parsing portion 10 is further configured to obtain a block-level quantization parameter adjustment flag after obtaining the block-level usage flag;

the first determination portion 11 is further configured to obtain an adjusted block-level quantization parameter in response to that the block-level usage flag indicates that the the neural network filtering is applied to any one colour component of the current block and that the block-level quantization parameter adjustment flag indicates a used state; and the first filtering portion 13 is further configured to filter the current block in the current frame based on the adjusted block-level quantization parameter and the neural network filtering model to obtain second residual information of the current block.

In some embodiments of the present application, the first determination portion 11 is further configured to: after obtaining the block-level usage flag, obtain a block-level quantization parameter corresponding to the current block in response to that the block-level usage flag indicates that the neural network filtering is applied to any one colour component of the current block; and the first filtering portion 13 is further configured to filter the current block in the current frame based on the adjusted block-level quantization parameter and the neural network filtering model to obtain second residual information of the current block.

In some embodiments of the present application, the parsing portion 10 is further configured to: after parsing the bitstream to obtain the frame-level usage flag based on the neural network filtering model and before obtaining the adjusted frame-level quantization parameter, obtain the frame-level control flag and the frame-level quantization parameter adjustment flag in response to that the frame-level usage flag indicates the used state and that the current frame is a first type of frame.

In some embodiments of the present application, the first determination portion 11 is further configured to determine a frame-level quantization offset parameter based on a frame-level quantization parameter adjustment index obtained from the bitstream; and determine the adjusted frame-level quantization parameter according to an obtained frame-level quantization parameter and the frame-level quantization offset parameter.

In some embodiments of the present application, the parsing portion 10 is further configured to obtain the adjusted frame-level quantization parameter from the bitstream.

In some embodiments of the present application, the first determination portion 11 is further configured to determine the block-level quantization offset parameter based on the block-level quantization parameter index obtained from the bitstream; and determine the adjusted block-level quantization parameter according to an obtained block-level quantization parameter and the block-level quantization offset parameter.

In some embodiments of the present application, the first determination portion 11 is further configured to: before filtering the current block in the current frame based on the adjusted frame-level quantization parameter and the neural network filtering model to obtain the first residual information of the current block, obtain a reconstructed value of the current block.

In some embodiments of the present application, the first filtering portion 13 is further configured to filter the reconstructed value of the current block and the adjusted frame-level quantization parameter by using the neural network filtering model to obtain the first residual information of the current block, so as to complete filtering of the current block.

In some embodiments of the present application, the first determination portion 11 is further configured to: before filtering the current block in the current frame based on the adjusted frame-level quantization parameter and the neural network filtering model to obtain the first residual information of the current block, obtain the reconstructed value of the current block and at least one of a prediction value of the current block, block partitioning information of the current block, or a deblocking filtering boundary strength of the current block.

In some embodiments of the present application, the first filtering portion 13 is further configured to filter the reconstructed value of the current block, the adjusted frame-level quantization parameter, and the at least one of the prediction value of the current block, the block partitioning information of the current block or the deblocking filtering boundary strength of the current block by using the neural network filtering model to obtain the first residual information of the current block, so as to complete filtering of the current block.

In some embodiments of the present application, the first determination portion 11 is further configured to: after filtering the current block in the current frame based on the adjusted frame-level quantization parameter and the neural network filtering model to obtain the first residual information of the current block, or after filtering the current block in the current frame based on an adjusted block-level quantization parameter and the neural network filtering model to obtain second residual information of the current block, obtain a second residual scaling factor from the bitstream; scale the first residual information or second residual information of the current block based on the second residual scaling factor to obtain first target residual information or second target residual information; determine a first target reconstructed value of the current block based on the first target residual information and a reconstructed value of the current block; and in response to that a block-level usage flag indicates a used state, determine a second target reconstructed value of the current block based on the second target residual information and the reconstructed value of the current block.

In some embodiments of the present application, the first determination portion 11 is further configured to determine the reconstructed value of the current block as the second target reconstructed value in response to that the block-level usage flag indicates an unused state.

In some embodiments of the present application, the first determination portion 11 is further configured to: after obtaining the frame-level usage flag that is based on the neural network filtering model, obtain a reconstructed value of the current block and at least one of a prediction value of the current block, block partitioning information of the current block, or a deblocking filtering boundary strength of the current block;

the parsing portion 10 is further configured to: in response to that the frame-level usage flag indicates the used state, obtain a frame-level control flag and a frame-level input parameter adjustment flag; wherein the frame-level input parameter adjustment flag indicates whether any one of the prediction value, the block partitioning information and the deblocking filtering boundary strength is adjusted;

the first determination portion 11 is further configured to: in response to that the frame-level control flag indicates the enabled state and that the frame-level input parameter adjustment flag indicates a used state, obtain an adjusted block-level input parameter; and the first filtering portion 13 is further configured to filter the current block in the current frame based on the adjusted block-level input parameter, an obtained frame-level quantization parameter and the neural network filtering model to obtain third residual information of the current block.

In some embodiments of the present application, the parsing portion 10 is further configured to: obtain a sequence-level enabled flag by parsing; and in response to that the sequence-level enabled flag indicates an allowed state, obtain the frame-level usage flag that is based on the neural network filtering model by parsing.

Figure 10:
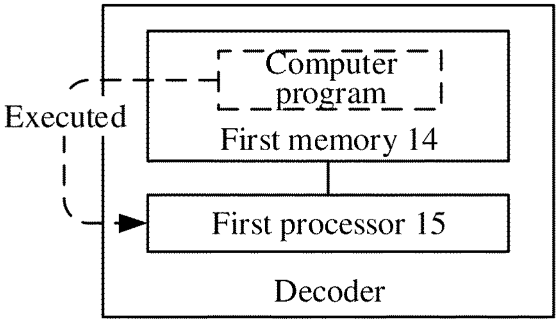
FIG. 10 is a schematic diagram of a hardware structure of a decoder provided in the embodiments of the present application.

The embodiments of the present application further provide a decoder 1, as shown in FIG. 10, the decoder 1 may include:

a first memory 14, configured to store a computer program executable on a first processor 15; and the first processor 15, configured to perform the method applied to the decoder when the computer program is executed.

It can be understood that the decoder can determine, based on the frame-level quantization parameter adjustment flag, whether a quantization parameter input into the neural network filtering model needs to be adjusted, which implements flexible selection and diversity change handling of quantization parameters (input parameters), thereby improving the decoding efficiency.

The first processor 15 may be implemented by software, hardware, firmware, or a combination thereof, using circuitry, single or multiple application specific integrated circuits (ASIC), single or multiple general purpose integrated circuits, single or multiple microprocessors, single or multiple programmable logic devices, or combinations of the aforementioned circuitry or devices, or other suitable circuitry or devices, so that the first processor 15 may perform corresponding steps of the filtering method at the decoder side in the aforementioned embodiments.

Figure 11:
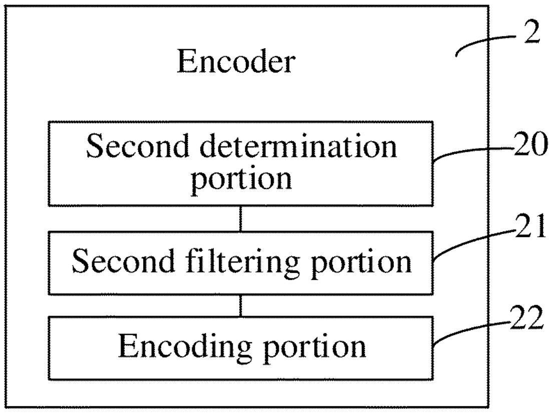
FIG. 11 is a schematic structural diagram of an encoder provided in the embodiments of the present application.

The embodiments of the present application provide an encoder 2, as shown in FIG. 11, the encoder 2 may include:

a second determination portion 20, configured to obtain a sequence-level enabled flag and to obtain an original value of a current block in a current frame, a reconstructed value of the current block, and a frame-level quantization parameter in response to that the sequence-level enabled flag indicates an allowed state; and a second filtering portion 21, configured to perform filtering estimation on the current block based on a neural network filtering model, the reconstructed value of the current block and the frame-level quantization parameter to determine a first reconstructed value;

where the second determination portion 20 is further configured to perform rate-distortion cost estimation based on the first reconstructed value and the original value of the current block to obtain a rate-distortion cost of the current block, and to traverse the current frame to determine a first rate-distortion cost of the current frame;

the second filtering portion 21 is further configured to perform filtering estimation on the current frame based on the neural network filtering model, at least one frame-level quantization offset parameter, the frame-level quantization parameter, and the reconstructed value of the current block in the current frame at least once, to determine at least one second rate-distortion cost of the current frame; and the second determination portion 20 is further configured to determine a frame-level quantization parameter adjustment flag based on the first rate-distortion cost and the at least one second rate-distortion cost.

In some embodiments of the present application, the second determination portion 20 is further configured to: obtain an i-th frame-level quantization offset parameter, and adjust the frame-level quantization parameter based on the i-th frame-level quantization offset parameter to obtain an i-th adjusted frame-level quantization parameter; wherein i is a positive integer greater than or equal to 1;

perform filtering estimation on the current block based on the neural network filtering model, the reconstructed value of the current block and the i-th adjusted frame-level quantization parameter to obtain an i-th second reconstructed value; and perform rate-distortion cost estimation based on the i-th second reconstructed value and the original value of the current block, traversing all blocks in the current frame to obtain an i-th second rate-distortion cost, and performing an (i+1)-th filtering estimation based on an (i+1)-th frame-level quantization offset parameter until the rate-distortion cost estimation is completed at least once, so as to determine the at least one second rate-distortion cost of the current frame.

In some embodiments of the present application, the second determination portion 20 is further configured to: determine a first minimum rate-distortion cost from the first rate-distortion cost and the at least one second rate-distortion cost;

if the first minimum rate-distortion cost is the first rate-distortion cost, determine that the frame-level quantization parameter adjustment flag indicates an unused state; or if the first minimum rate-distortion cost is any one of the at least one second rate-distortion cost, determine that the frame-level quantization parameter adjustment flag indicates a used state.

In some embodiments of the present application, the second determination portion 20 is further configured to: in response to that the sequence-level enabled flag indicates the allowed state, performrate-distortion cost estimation based on the original value and the reconstructed value of the current block in the current frame to obtain a third rate-distortion cost.

In some embodiments of the present application, the second filtering portion 21 is further configured to: after determining the frame-level quantization parameter adjustment flag based on the first rate-distortion cost and the at least one second rate-distortion cost, perform filtering estimation on the current block based on the neural network filtering model, the reconstructed value of the current block and the frame-level quantization parameter to determine a third reconstructed value;

the second determination portion 20 is further configured to perform rate-distortion cost estimation based on the third reconstructed value and the original value of the current block to obtain a fourth rate-distortion cost of the current block;

the second filtering portion 21 is further configured to perform filtering estimation on the current block based on the neural network filtering model, a target reconstructed value corresponding to the first minimum rate-distortion cost, and the frame-level quantization parameter, to obtain a fourth reconstructed value; and the second determination portion 20 is further configured to: perform rate-distortion cost estimation based on the fourth reconstructed value and the original value of the current block to obtain a fifth rate-distortion cost of the current block; determine a block-level usage flag based on the fourth rate-distortion cost and the fifth rate-distortion cost; and traverse all blocks in the current frame, and determine a sum of a minimum rate-distortion cost of each of the blocks in the current frame as a sixth rate-distortion cost of the current frame.

In some embodiments of the present application, the second determination portion 20 is further configured to: if the fourth rate-distortion cost is less than the fifth rate-distortion cost, determine that the block-level usage flag indicates an unused state; or if the fourth rate-distortion cost is greater than or equal to the fifth rate-distortion cost, determining that the block-level usage flag indicates a used state.

In some embodiments of the present application, the encoder 2 further includes: an encoding portion 22. The second determination portion 20 is further configured to: if a minimum rate-distortion cost among the third rate-distortion cost, the first minimum rate-distortion cost and the sixth rate-distortion cost is the third rate-distortion cost, determine that the frame-level usage flag indicates an unused state; and encoding the frame-level usage flag into a bitstream; and the encoding portion 22 is configured to encode the frame-level usage flag into a bitstream.

Alternatively, the second determination portion 20 is further configured to: if the minimum rate-distortion cost among the third rate-distortion cost, the first minimum rate-distortion cost and the sixth rate-distortion cost is the first minimum rate-distortion cost, determine that the frame-level usage flag indicates a used state and that the frame-level control flag indicates an enabled state; and the encoding portion 22 is further configured to encode the frame-level usage flag and the frame-level control flag into the bitstream.

Alternatively, the second determination portion 20 is further configured to: if the minimum rate-distortion cost among the third rate-distortion cost, the first minimum rate-distortion cost and the sixth rate-distortion cost is the sixth rate-distortion cost, determining that the frame-level usage flag indicates the used state and that the frame-level control flag indicates a disabled state; and the encoding portion 22 is configured to encode the frame-level usage flag, the frame-level control flag, and the block level usage flag into the bitstream.

In some embodiments of the present application, the encoding portion 22 is configured to: after determining the frame-level quantization parameter adjustment flag based on the first rate-distortion cost and the at least one second rate-distortion cost, if the first minimum rate-distortion cost is any one of the at least one second rate-distortion cost, encode one frame-level quantization offset parameter, from the least one frame-level quantization offset parameter, that is corresponding to the first minimum rate-distortion cost into a bitstream; or encode a block-level quantization parameter index of the frame-level quantization offset parameter corresponding to the first minimum rate-distortion cost into the bitstream.

In some embodiments of the present application, the second filtering portion 21 is further configured to: perform, for the current frame, filtering estimation on the current block based on the neural network filtering model, the reconstructed value of the current block and the frame-level quantization parameter to determine first estimated residual information; determine a first residual scaling factor; scale the first estimated residual value by using the first residual scaling factor to obtain first scaled residual information; and .add up the first scaled residual information and the reconstructed value of the current block to determine the first reconstructed value.

In some embodiments of the present application, the second determination portion 20 is further configured to: obtain, for the current frame, a reconstructed value of the current block and at least one of a prediction value of the current block, block partitioning information of the current block or a deblocking filtering boundary strength of the current block;

the second filtering portion 21 is further configured to: perform filtering estimation on the reconstructed value of the current block, the frame-level quantization parameter, and the at least one of the prediction value of the current block, the block partitioning information of the current block or the deblocking filtering boundary strength of the current block by using the neural network filtering model to obtain the first estimated residual information of the current block.

In some embodiments of the present application, the encoding portion 22 is configured to encode the first residual scaling factor into a bitstream if the first minimum rate-distortion cost is the first rate-distortion cost.

In some embodiments of the present application, the second filtering portion 21 is further configured to: perform filtering estimation on the current block based on the neural network filtering model, the reconstructed value of the current block and the i-th adjusted frame-level quantization parameter once, to obtain an i-th piece of second estimated residual information; determine an i-th second residual scaling factor corresponding to the i-th adjusted frame-level quantization parameter; scale the i-th piece of second estimated residual information by using the i-th second residual scaling factor to obtain an i-th piece of second scaled residual information; and .add up the i-th piece of second scaled residual information and a corresponding reconstructed value of the current block to determine the i-th second reconstructed value.

In some embodiments of the present application, the encoding portion 22 is configured to: after determining the frame-level quantization parameter adjustment flag based on the first rate-distortion cost and the at least one second rate-distortion cost, if the first minimum rate-distortion cost is any one of the at least one second rate-distortion cost, encode a second residual scaling factor corresponding to the first minimum rate-distortion cost into a bitstream.

In some embodiments of the present application, the second determination portion 20 is further configured to: before determining the i-th second residual scaling factor corresponding to the i-th adjusted frame-level quantization parameter, obtain the reconstructed value of the current block and at least one of a prediction value of the current block, block partitioning information of the current block or a deblocking filtering boundary strength of the current block; and the second filtering portion 21 is further configured to perform frame-level filtering estimation on the reconstructed value of the current block, the i-th adjusted frame-level quantization parameter, and the at least one of the prediction value of the current block, the block partitioning information of the current block or the deblocking filtering boundary strength of the current block by using the neural network filtering model, to obtain the i-th piece of second estimated residual information of the current block.

In some embodiments of the present application, the second filtering portion 21 is further configured to: in response to that the current frame is a first type of frame, perform filtering estimation on the current frame based on the current frame based on the neural network filtering model, the at least one frame-level quantization offset parameter, the frame-level quantization parameter, and the reconstructed value of the current block in the current frame at least once, to determine the at least one second rate-distortion cost of the current frame.

In some embodiments of the present application, the second filtering portion 21 is further configured to: after performing rate-distortion cost estimation based on the third reconstructed value and the original value of the current block to obtain the fourth rate-distortion cost of the current block, and before determining the block-level usage flag based on the fourth rate-distortion cost and the fifth rate-distortion cost, perform filtering estimation on the current block based on the neural network filtering model, the reconstructed value of the current block, the at least one frame-level quantization offset parameter and the frame-level quantization parameter at least once, to determine at least one fifth reconstructed value; and determine a minimum fifth rate-distortion cost based on the at least one fifth reconstructed value and the original value of the current block.

In some embodiments of the present application, the second determination portion 20 is further configured to: in response to that the sequence-level enabled flag indicates the allowed state, obtaining the reconstructed value of the current block, the frame-level quantization parameter, and at least one of a prediction value of the current block, block partitioning information of the current block or a deblocking filtering boundary strength of the current block;

the second filtering portion 21 is further configured to: perform filtering estimation on the current block based on the neural network filtering model, the reconstructed value of the current block, the frame-level quantization parameter, and the at least one of the prediction value of the current block, the block partitioning information of the current block or the deblocking filtering boundary strength of the current block, to determine a sixth reconstructed value;

the second determination portion 20 is further configured to: rate-distortion cost estimation based on the sixth reconstructed value and the original value of the current block to obtain the rate-distortion cost of the current block, and traversing the current frame to determine a seventh rate-distortion cost of the current frame;

the second filtering portion 21 is further configured to: perform filtering estimation on the current frame based on the neural network filtering model, at least one frame-level input offset parameter, the reconstructed value of the current block in the current frame, and the at least one of the prediction value of the current block, the block partitioning information of the current block or the deblocking filtering boundary strength of the current block at least once, to determine at least one eighth rate-distortion cost of the current frame; and the second determination portion 20 is further configured to determine a frame-level input parameter adjustment flag based on the first rate-distortion cost and the at least one eighth rate-distortion cost.

Figure 12:
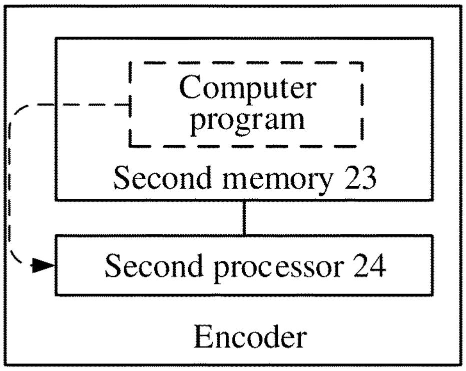
FIG. 12 is a schematic diagram of a hardware structure of an encoder provided in the embodiments of the present application.

The embodiments of the present application provide an encoder 2, as shown in FIG. 12, the encoder 2 may include:

a second memory 23, configured to store a computer program executable on a first processor 24; and the second processor 24, configured to perform the method applied to the encoder when the computer program is executed.

It can be understood that the encoder can determine whether the quantization parameter of the input neural network filtering model need to be adjusted based on the frame-level quantization parameter adjustment flag, thereby realizing flexible selection and diverse change processing of the quantization parameter (input parameters), thereby improving decoding efficiency.

The embodiments of the present application provide a non-transitory computer-readable storage medium, and the non-transitory computer-readable storage medium stores a computer program that, when executed on a first processor, causes the method described at the decoder side or the method described at the encoder side to be implemented.

The various components in various embodiments of the present application may be integrated into one processing unit, or each unit may be physically present, or two or more units may be integrated into one unit. The above-mentioned integrated unit can be implemented in the form of hardware or a software functional unit.

The integrated unit may be stored in a computer readable storage when it is implemented in the form of a software functional unit and is sold or used as a separate product. Based on such understanding, the technical solutions of the embodiments essentially, or the part of the technical solutions that contributes to the related art, or all or part of the technical solutions, may be embodied in the form of a software product which is stored in a storage medium and includes instructions for causing a computer device (which may be a personal computer, a server, or a network device and so on) or a processor to perform all or part of the steps described in the various embodiments of the present application. The above storage medium includes various media that can store program codes, such as ferromagnetic random access memory (FRAM), read-only memory (ROM), programmable read-only memory (PROM), erasable programmable read-only memory (EPROM), electrically erasable programmable read-only memory (EEPROM), flash memory, magnetic surface memory, an optical disc, or compact disc read-only memory (CD-ROM, which is not limited in the implementations of the present application.

The foregoing are merely specific embodiments of the present present application, but the protection scope of the present present application is not limited thereto. Any person skilled in the art may readily conceive variations or substitutions within the technical scope disclosed by the present present application, which should be included within the protection scope of the present present application. Therefore, the protection scope of the present present application shall be subject to the protection scope of the claims.

INDUSTRIAL APPLICABILITY

The embodiments of the present application provide a filtering method, an encoder, a decoder and a storage medium, which obtain a frame-level usage flag based on a neural network filtering model by parsing a bitstream, obtain a frame-level control flag, used to determine whether each block in the current frame is filtered, and a frame-level quantization parameter adjustment flag in response to that the frame-level usage flag indicates a used state, obtain an adjusted frame-level quantization parameter in response to that the frame-level control flag indicates an enabled state and that the frame-level quantization parameter adjustment flag indicates a used state, and filter a current block in the current frame based on the adjusted frame-level quantization parameter and the neural network filtering model to obtain first residual information of the current block. In this way, whether the quantization parameter of an input neural network filtering model need to be adjusted may be determined based on the frame-level quantization parameter adjustment flag, which may implements flexible selection and diversity change handling of quantization parameters (input parameters), thereby improving the decoding efficiency.

What is claimed is:

1. A filtering method, applied to a decoder, wherein the method comprises:

parsing a bitstream to obtain a frame-level usage flag, wherein the frame-level usage flag is used to indicate whether a neural network filtering is enabled for a current frame;

in response to that the frame-level usage flag indicates that the neural network filtering is enabled for the current frame, obtaining a frame-level control flag and a frame-level quantization parameter adjustment flag; wherein the frame-level control flag is used to determine whether the neural network filtering is applied to all blocks in the current frame, and the frame-level quantization parameter adjustment flag is used to indicate whether a quantization parameter is adjusted for the current frame;

in response to that the frame-level control flag indicates that the neural network filtering is applied to all blocks in the current frame, and that the frame-level quantization parameter adjustment flag indicates that the quantization parameter is adjusted for the current frame, obtaining an adjusted frame-level quantization parameter; and filtering a current block in the current frame based on the adjusted frame-level quantization parameter and a neural network filtering model to obtain first residual information of the current block;

wherein the method further comprises:

in response to that the frame-level control flag indicates that the neural network filtering is only applied to a portion of blocks in the current frame, obtaining a block-level usage flag;

in response to that the block-level usage flag indicates that the neural network filtering is applied to any one colour component of the current block, and that the frame-level quantization parameter adjustment flag indicates that the quantization parameter is adjusted for the current frame, obtaining an adjusted frame-level quantization parameter; and filtering the current block in the current frame based on the adjusted frame-level quantization parameter and the neural network filtering model to obtain first residual information of the current block.

2. The method according to claim 1, wherein obtaining the adjusted frame-level quantization parameter comprises:

determining a frame-level quantization offset parameter based on a frame-level quantization parameter adjustment index obtained from the bitstream; and determining the adjusted frame-level quantization parameter according to an obtained frame-level quantization parameter and the frame-level quantization offset parameter.

3. The method according to claim 1, wherein before filtering the current block in the current frame based on the adjusted frame-level quantization parameter and the neural network filtering model to obtain the first residual information of the current block, the method further comprises:

obtaining a reconstructed value of the current block.

4. The method according to claim 3, wherein before filtering the current block in the current frame based on the adjusted frame-level quantization parameter and the neural network filtering model to obtain the first residual information of the current block, the method further comprises:

obtaining the reconstructed value of the current block and at least one of a prediction value of the current block, block partitioning information of the current block, or a deblocking filtering boundary strength of the current block.

5. The method according to claim 4, wherein filtering the current block in the current frame based on the adjusted frame-level quantization parameter and the neural network filtering model to obtain the first residual information of the current block comprises:

filtering the reconstructed value of the current block, the adjusted frame-level quantization parameter, and the at least one of the prediction value of the current block, the block partitioning information of the current block or the deblocking filtering boundary strength of the current block by using the neural network filtering model to obtain the first residual information of the current block.

6. The method according to claim 1, wherein after filtering the current block in the current frame based on the adjusted frame-level quantization parameter and the neural network filtering model to obtain the first residual information of the current block, or after filtering the current block in the current frame based on an adjusted block-level quantization parameter and the neural network filtering model to obtain second residual information of the current block, the method further comprises:

obtaining a second residual scaling factor from the bitstream;

scaling the first residual information or second residual information of the current block based on the second residual scaling factor to obtain first target residual information or second target residual information;

determining a first target reconstructed value of the current block based on the first target residual information and a reconstructed value of the current block; or in response to that a block-level usage flag indicates that the neural network filtering is applied to any one colour component of the current block, determining a second target reconstructed value of the current block based on the second target residual information and the reconstructed value of the current block.

7. The method according to claim 1, wherein obtaining the frame-level usage flag comprises:

obtaining a sequence-level enabled flag by parsing; and in response to that the sequence-level enabled flag indicates that neural network based in-loop filtering is allowed to be used, obtaining the frame-level usage flag by parsing.

8. A filtering method, applied to an encoder, wherein the method comprises:

obtaining a sequence-level enabled flag;

in response to that the sequence-level enabled flag indicates that neural network based in-loop filtering is allowed to be used, obtaining an original value of a current block in a current frame, a reconstructed value of the current block, and a frame-level quantization parameter;

performing filtering estimation on the current block based on a neural network filtering model, the reconstructed value of the current block and the frame-level quantization parameter to determine a first reconstructed value;

performing rate-distortion cost estimation based on the first reconstructed value and the original value of the current block to obtain a rate-distortion cost of the current block, and traversing the current frame to determine a first rate-distortion cost of the current frame;

performing filtering estimation on the current frame based on the neural network filtering model, at least one frame-level quantization offset parameter, the frame-level quantization parameter, and the reconstructed value of the current block in the current frame at least once to determine at least one second rate-distortion cost of the current frame; and determining a frame-level quantization parameter adjustment flag based on the first rate-distortion cost and the at least one second rate-distortion cost.

9. The method according to claim 8, wherein performing filtering estimation on the current frame based on the neural network filtering model, the at least one frame-level quantization offset parameter, the frame-level quantization parameter, and the reconstructed value of the current block in the current frame at least once to determine the at least one second rate-distortion cost of the current frame comprises:

obtaining an i-th frame-level quantization offset parameter, and adjusting the frame-level quantization parameter based on the i-th frame-level quantization offset parameter to obtain an i-th adjusted frame-level quantization parameter; wherein i is a positive integer greater than or equal to 1;

performing filtering estimation on the current block based on the neural network filtering model, the reconstructed value of the current block and the i-th adjusted frame-level quantization parameter to obtain an i-th second reconstructed value; and performing rate-distortion cost estimation based on the i-th second reconstructed value and the original value of the current block, traversing all blocks in the current frame to obtain an i-th second rate-distortion cost, and performing an (i+1)-th filtering estimation based on an (i+1)-th frame-level quantization offset parameter until the rate-distortion cost estimation is completed at least once, so as to determine the at least one second rate-distortion cost of the current frame.

10. The method according to claim 8, wherein determining the frame-level quantization parameter adjustment flag based on the first rate-distortion cost and the at least one second rate-distortion cost comprises:

determining a first minimum rate-distortion cost from the first rate-distortion cost and the at least one second rate-distortion cost;

if the first minimum rate-distortion cost is the first rate-distortion cost, determining that the frame-level quantization parameter adjustment flag indicates that the quantization parameter is not adjusted for the current frame; or if the first minimum rate-distortion cost is any one of the at least one second rate-distortion cost, determining that the frame-level quantization parameter adjustment flag indicates that the quantization parameter is adjusted for the current frame.

11. The method according to claim 10, wherein the method further comprises:

in response to that the sequence-level enabled flag indicates that the neural network based in-loop filtering is allowed to be used, performing rate-distortion cost estimation based on the original value and the reconstructed value of the current block in the current frame to obtain a third rate-distortion cost.

12. The method according to claim 11, wherein after determining the frame-level quantization parameter adjustment flag based on the first rate-distortion cost and the at least one second rate-distortion cost, the method further comprises:

performing filtering estimation on the current block based on the neural network filtering model, the reconstructed value of the current block and the frame-level quantization parameter to determine a third reconstructed value;

performing rate-distortion cost estimation based on the third reconstructed value and the original value of the current block to obtain a fourth rate-distortion cost of the current block;

performing filtering estimation on the current block based on the neural network filtering model, a target reconstructed value corresponding to the first minimum rate-distortion cost, and the frame-level quantization parameter, to obtain a fourth reconstructed value;

performing rate-distortion cost estimation based on the fourth reconstructed value and the original value of the current block to obtain a fifth rate-distortion cost of the current block;

determining a block-level usage flag based on the fourth rate-distortion cost and the fifth rate-distortion cost; and traversing all blocks in the current frame, and determining a sum of a minimum rate-distortion cost of each of the blocks in the current frame as a sixth rate-distortion cost of the current frame.

13. The method according to claim 12, wherein the method further comprises:

if a minimum rate-distortion cost among the third rate-distortion cost, the first minimum rate-distortion cost and the sixth rate-distortion cost is the third rate-distortion cost, determining that the frame-level usage flag indicates that the neural network filtering is not enabled for the current frame; and encoding the frame-level usage flag into a bitstream;

if the minimum rate-distortion cost among the third rate-distortion cost, the first minimum rate-distortion cost and the sixth rate-distortion cost is the first minimum rate-distortion cost, determining that the frame-level usage flag indicates that the neural network filtering is enabled for the current frame and that the frame-level control flag indicates that the neural network filtering is applied to all blocks in the current frame; and encoding the frame-level usage flag and the frame-level control flag into the bitstream; or if the minimum rate-distortion cost among the third rate-distortion cost, the first minimum rate-distortion cost and the sixth rate-distortion cost is the sixth rate-distortion cost, determining that the frame-level usage flag indicates that the neural network filtering is enabled for the current frame and that the frame-level control flag indicates that the neural network filtering is applied to a portion of blocks in the current frame; and encoding the frame-level usage flag, the frame-level control flag, and the block-level usage flag into the bitstream.

14. The method according to claim 9, wherein after determining the frame-level quantization parameter adjustment flag based on the first rate-distortion cost and the at least one second rate-distortion cost, the method further comprises:

if the first minimum rate-distortion cost is any one of the at least one second rate-distortion cost, encoding one frame-level quantization offset parameter, from the least one frame-level quantization offset parameter, that is corresponding to the first minimum rate-distortion cost into a bitstream, or encoding a block-level quantization parameter index of the frame-level quantization offset parameter corresponding to the first minimum rate-distortion cost into the bitstream.

15. The method according to claim 8, wherein performing filtering estimation on the current block based on the neural network filtering model, the reconstructed value of the current block and the frame-level quantization parameter to determine the first reconstructed value comprises:

for the current frame, performing filtering estimation on the current block based on the neural network filtering model, the reconstructed value of the current block and the frame-level quantization parameter to determine first estimated residual information;

determining a first residual scaling factor;

scaling the first estimated residual information by using the first residual scaling factor to obtain first scaled residual information; and adding up the first scaled residual information and the reconstructed value of the current block to determine the first reconstructed value.

16. The method according to claim 15, wherein before determining the first residual scaling factor, the method further comprises:

for the current frame, obtaining a reconstructed value of the current block and at least one of a prediction value of the current block, block partitioning information of the current block or a deblocking filtering boundary strength of the current block; and performing filtering estimation on the reconstructed value of the current block, the frame-level quantization parameter, and the at least one of the prediction value of the current block, the block partitioning information of the current block or the deblocking filtering boundary strength of the current block by using the neural network filtering model to obtain the first estimated residual information of the current block.

17. The method according to claim 8, wherein performing filtering estimation on the current frame based on the neural network filtering model, the at least one frame-level quantization offset parameter, the frame-level quantization parameter, and the reconstructed value of the current block in the current frame at least once to determine the at least one second rate-distortion cost of the current frame comprises:

in response to that the current frame is a first type of frame, performing filtering estimation on the current frame based on the current frame based on the neural network filtering model, the at least one frame-level quantization offset parameter, the frame-level quantization parameter, and the reconstructed value of the current block in the current frame at least once, to determine the at least one second rate-distortion cost of the current frame.

18. The method according to claim 8, wherein the method further comprises:

in response to that the sequence-level enabled flag indicates that the neural network based in-loop filtering is allowed to be used, obtaining the reconstructed value of the current block, the frame-level quantization parameter, and at least one of a prediction value of the current block, block partitioning information of the current block or a deblocking filtering boundary strength of the current block;

performing filtering estimation on the current block based on the neural network filtering model, the reconstructed value of the current block, the frame-level quantization parameter, and the at least one of the prediction value of the current block, the block partitioning information of the current block or the deblocking filtering boundary strength of the current block, to determine a sixth reconstructed value;

performing rate-distortion cost estimation based on the sixth reconstructed value and the original value of the current block to obtain the rate-distortion cost of the current block, and traversing the current frame to determine a seventh rate-distortion cost of the current frame;

performing filtering estimation on the current frame based on the neural network filtering model, at least one frame-level input offset parameter, the reconstructed value of the current block in the current frame, and the at least one of the prediction value of the current block, the block partitioning information of the current block or the deblocking filtering boundary strength of the current block at least once, to determine at least one eighth rate-distortion cost of the current frame; and determining a frame-level input parameter adjustment flag based on the first rate-distortion cost and the at least one eighth rate-distortion cost.

19. A non-transitory computer-readable storage medium, having a computer program and a bitstream stored thereon, wherein the computer program, when executed by a processor, enables the processor to perform the steps of the filtering method of claim 8 to generate the bitstream.

* * * * *